United States Patent
Ramlaoui et al.

(10) Patent No.: US 6,968,675 B2
(45) Date of Patent: Nov. 29, 2005

(54) CASCADELESS FAN THRUST REVERSER WITH PLUME CONTROL

(75) Inventors: Jihad I. Ramlaoui, Chula Vista, CA (US); Randall J. Seaver, Chula Vista, CA (US); Norman J. James, San Diego, CA (US); Stuart J. Byrne, San Diego, CA (US); Sheila Cornejo, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 183 days.

(21) Appl. No.: 10/282,550

(22) Filed: Oct. 29, 2002

(65) Prior Publication Data

US 2004/0079073 A1  Apr. 29, 2004

(51) Int. Cl.⁷ .................................. F02K 3/02
(52) U.S. Cl. .................. 60/226.2; 60/226.1; 60/230
(58) Field of Search ............... 60/226.1, 226.2, 60/230, 228, 232

(56) References Cited

U.S. PATENT DOCUMENTS

| | | | |
|---|---|---|---|
| 3,500,645 A | 3/1970 | Horn | |
| 3,599,432 A | 8/1971 | Ellis | |
| 4,232,516 A | 11/1980 | Lewis et al. | 60/226 A |
| 6,029,439 A | 2/2000 | Gonidec et al. | 60/226.2 |
| 6,101,807 A * | 8/2000 | Gonidec et al. | 60/226.2 |
| 6,568,172 B2 * | 5/2003 | Jannetta et al. | 60/226.2 |
| 6,663,042 B2 * | 12/2003 | Hatrick et al. | 244/110 B |
| 2002/0100837 A1 | 8/2002 | Hatrick et al. | |
| 2003/0056493 A1 | 3/2003 | Jannetta et al. | |

FOREIGN PATENT DOCUMENTS

| | | |
|---|---|---|
| EP | 1181746 | 2/1970 |
| EP | 0321993 A2 | 2/1988 |
| EP | 0321993 A2 | 2/1988 |
| FR | 2030034 | 10/1970 |
| GB | 1386232 | 3/1971 |

\* cited by examiner

Primary Examiner—Cheryl Tyler
Assistant Examiner—William H. Rodriguez
(74) Attorney, Agent, or Firm—Goodwin Procter LLP

(57) ABSTRACT

A thrust reverser for a turbofan engine having an air duct defined radially inwardly by a wall around the turbofan engine and radially outwardly in part by a fan cowl of the engine. A bulkhead is adapted to be mounted on the fan cowl having a shaped surface defining an upstream wall. A translating cowl is supported for movement axially between a closed position substantially adjacent the bulkhead and an open position spaced axially apart from the bulkhead so as to form an outlet for discharge of air from the air duct. The translating cowl has a first wall and a kicker plate defining a shaped surface. The kicker plate and/or the bulkhead may have a dimension which varies at different radial locations about a circumference of the translating cowl to selectively control the forward component of velocity of the air discharged from the air duct. A plume control device may extend longitudinally across the outlet to divide the air discharged from the air duct into a plurality of plumes. A vane spaced axially aft from the bulkhead has an airfoil section to guide air to the outlet in order to control turning and area match when the translating cowl is in the deployed position.

41 Claims, 23 Drawing Sheets

CASCADELESS FAN THRUST REVERSER WITH PLUME CONTROL

BACKGROUND OF THE INVENTION

1. Field of the Invention

This invention relates to gas turbine engine thrust reversers, and more particularly to cascadeless, translating cowl thrust reversers for ducted fan gas turbine engines, which redirect the air flow in the duct outwardly and forwardly when the thrust reverser is deployed.

2. Background Information

One general type of thrust reverser for use with the air duct of a turbofan engine incorporates a translating cowl that forms a rearward, outer wall portion of the air duct. For normal rearward air flow through the air duct, the translating cowl resides in a closed position in which its forward end engages a bulkhead that is mounted on the fan cowl of the engine. To reverse the air flow, the translating cowl is moved in an aft direction away from the bulkhead leaving an outlet opening aft of the bulkhead through which air is discharged from the air duct. The thrust reverser also provides for blocking of the air duct at a location aft of the outlet opening.

In one form of blocking system, a number of blocking doors are pivotally mounted on the translating cowl and coupled by linkages to the engine cowl. When the translating cowl moves rearwardly upon deployment of the thrust reverser, the linkages pivot the blocking doors radially inwardly to positions in which they block the air duct. Another form of blocking system is an inner wall member on the translating cowl that is located and shaped to form the outer wall of the portion of the duct inwardly of the thrust reverser outlet opening when the translating cowl is in the forward position and to block the air duct when the translating cowl is in the rearward, reverse-thrust position.

Cascade thrust reversers, as are known in the art, provide a cascade of flow turning vanes to assist in turning the flow therethrough to provide the forward component of velocity. U.S. Pat. No. 4,232,516 describes a cascadeless thrust reverser which deflects the air flow through an aperture in a forward direction. An annular plate is positioned on the fan cowl and projects into the turbulent flow region in the air duct. The annular plate and the side wall define a recess open to the flow which delays the separation of the flow from the side wall. U.S. Pat. No. 6,029,439 describes a pivot-door thrust reverser having a plurality of pivoting doors. At least one guide vane is connected to the fan cowl bulkhead and located within the air duct when a thrust reverser door is in the forward thrust position so as to guide the air passing through the reverse thrust opening.

A disadvantage of the prior art cascadeless thrust reversers is that they provide no method or structure for controlling the plume which is directed forwardly when the thrust reverser is deployed. Such plumes may impinge upon the fuselage and aircraft control surfaces and thereby affect the stability of the aircraft during landing and may cause foreign object damage to the engine rotating machinery.

Accordingly, there is a need in the art for a cascadeless translating cowl thrust reverser which provides sufficient reverse thrust with minimal effect on the stability of the aircraft and minimal effect on the engine operation when the thrust reverser is deployed.

SUMMARY OF THE INVENTION

An object of the present invention is to provide an effective thrust reverser which provides sufficient reverse thrust to effectively slow down an aircraft at landing. Another object of the present invention is to provide control of the exhaust plumes when the thrust reverser is deployed.

These and other objects of the invention, which will become apparent with reference to the disclosure herein, are accomplished by a thrust reverser for a turbofan engine having an air duct defined radially inwardly by a wall around the turbofan engine and radially outwardly in part by a fan cowl of the engine. The thrust reverser includes a bulkhead adapted to be mounted on the fan cowl defining a first wall, including a "ramp" portion. A translating cowl is provided which has a second wall and a kicker plate. The translating cowl is supported for movement axially between a closed position substantially adjacent to the bulkhead and an open position spaced axially apart from the bulkhead so as to form an outlet for discharge of air from the air duct, such that the air discharged from the air duct has a forward component of velocity.

Exhaust plume control is provided by the kicker plate and/or by plume control devices. The plume control devices provide efflux plume control to direct the reverser exhaust away from the ground and aircraft structure in order to minimize plume effects on aircraft stability and control, on engine inlet air distortion and foreign object damage. The kicker plate has a dimension which may vary at different radial locations about a circumference of the translating cowl to selectively control the forward component of velocity of the air discharged from the air duct. Similarly, the ramp surface of the bulkhead has a dimension which may vary at different radial locations about a circumference of the bulkhead to selectively control the forward component of velocity of the air discharged from the air duct. A plume control device extends longitudinally across the outlet to divide the air flow exiting the air duct into a plurality of plumes. Plume control device shape, size, and location help ensure efficient outlets and help divert the plumes radially to a predefined direction. In one embodiment, the plume control device may include a plurality of cells defined by vanes. The vanes may divert the flow into a radial direction and/or a forward direction.

The thrust reverser may further include a vane element spaced axially apart from the upstream wall of the bulkhead in an aft direction. The vane preferably has an airfoil section to guide air to the outlet when the translating cowl is in the open position. According to another embodiment, the vane element may have a ring-shaped configuration and be supported by a plurality of vane supports which mount the vane element to the bulkhead. The vane supports may have an airfoil section and divert the flow between the vane element and the bulkhead to a predefined direction.

In another embodiment, the thrust reverser does not include blocker doors to substantially block the flow of air to the aft portion of the air duct. For this embodiment, the wall of the turbofan engine and the translating cowl cooperate to substantially block airflow when the translating cowl is in the open configuration. In other embodiments, the thrust reverser may include a plurality of blocking doors pivotably attached to the translating cowl via links to the engine cowl to substantially block air from passing through an aft portion of the air duct when the translating cowl is in the open position. The thrust reverser may also include a fixed aft cowl section behind the translating cowl, and the translating cowl may be configured with an outer wall portion and an inner wall portion that are connected together. In another embodiment, the outer wall portion and the inner wall portion may be two separate components which are configured for relative radial movement with respect to one another, between a first position where the outer wall and the inner wall are in close approximation when the translating cowl is in the closed position and a spaced-apart position when the translating cowl is in the open (deployed) position.

In accordance with the invention, the objects of providing sufficient forward thrust while controlling the exhaust plumes have been met. Further features of the invention, its nature and various advantages will be more apparent from the accompanying drawings and the following detailed description of illustrative embodiments.

DETAILED DESCRIPTION OF THE INVENTION

Figure 1:
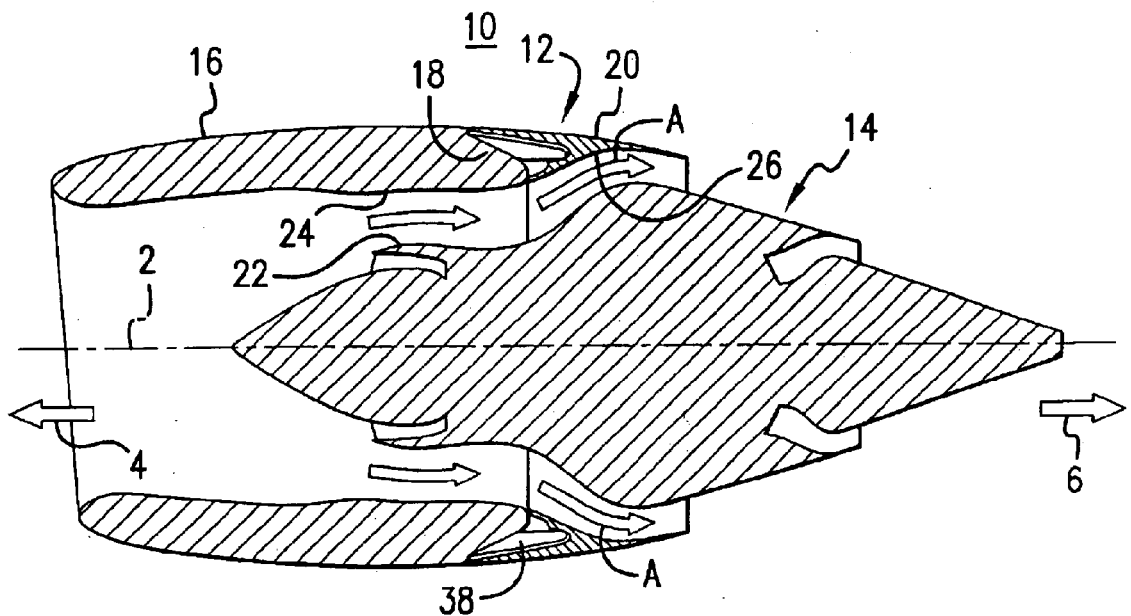
FIG. 1 is a longitudinal sectional view of a turbofan engine nacelle and cascadeless thrust reverser in a closed (stowed) configuration, in accordance with the invention.
Figure 2:
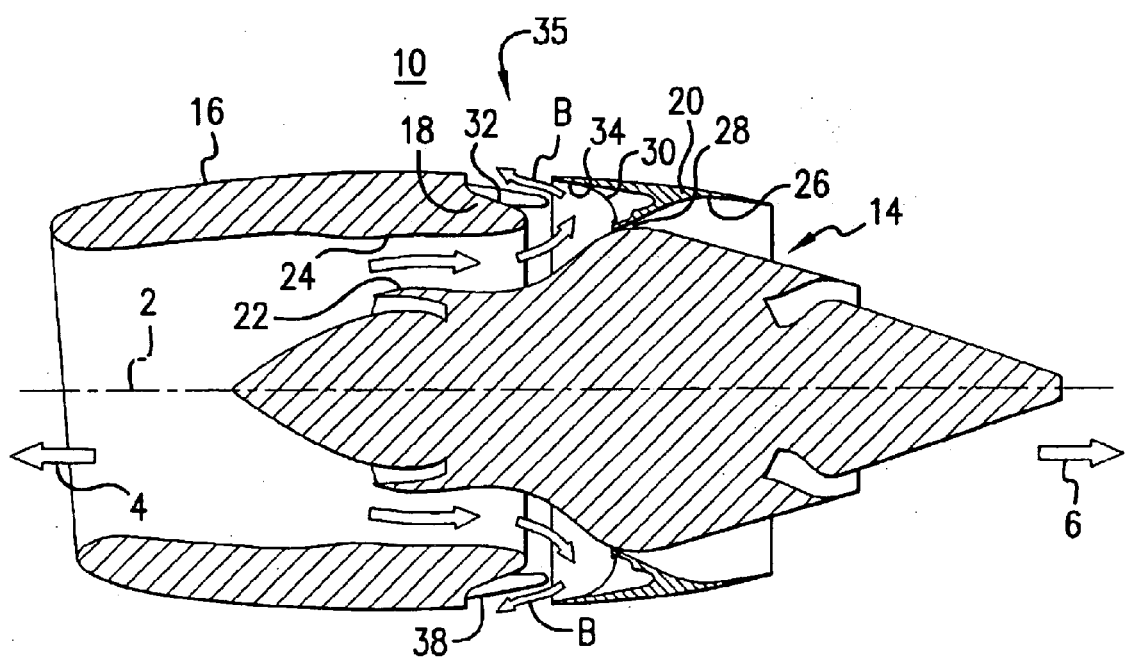
FIG. 2 is a longitudinal sectional view of a turbofan engine nacelle and cascadeless thrust reverser in an open (deployed) configuration, in accordance with the invention.

In accordance with the invention, an exemplary embodiment of a thrust reverser 12 used with a turbofan nacelle 10 is illustrated in FIGS. 1–2. In the description that follows, the center line of the nacelle 10 (also referred to herein as the longitudinal axis) is indicated by dotted line 2, the forward direction is indicated by arrow 4, and the aft direction is indicated by arrow 6. In the exemplary embodiment, an annular air duct is defined between the engine 14, and the fan cowl 16. The aft portion of the fan cowl 16 may include a torque box or bulkhead 18, which cooperates with a translating cowl 20. The translating cowl 20 is movable between a forward position and an aft position by a series of actuators (not shown). FIG. 1 illustrates the translating cowl 20 in a forward position, such that the translating cowl 20 and the bulkhead 18 are in contact or closely spaced with respect to one another, and having a conventional seal therebetween as is well known in the art, and that their outer contours form a continuous surface for the air flow. The thrust reverser 12 is considered to be in a "stowed" or closed configuration when the translating cowl is in this forward position. The air duct extends substantially fore to aft, and is defined inwardly by the wall 22 of the engine 14, and outwardly by the inner wall 24 of the fan cowl 16 and by the inner wall 26 of the translating cowl 20. In the closed configuration, the flow of air through the air duct is indicated by arrows A.

Upon command by the pilot, the series of actuators (not shown), drive the translating cowl 20 in the aft direction towards the position shown in FIG. 2. The thrust reverser 12 is considered to be in a "deployed" or open configuration in FIG. 2. The inner wall 26 of the translating cowl 20 moves to a location that places its inner, forward edge 28 close to the core cowl 22 of the engine 14. When the translating cowl 20 is in this position, air flow to the aft portion of the air duct is substantially blocked. In the deployed configuration, the air duct is defined inwardly in part by the core cowl 22 of the engine 14 and in part by the downstream wall 30 of the translating cowl 20. The air duct is defined outwardly in part by the inner wall 24 of the fan cowl 16 and the ramp portion 32 of the bulkhead 18. In the deployed configuration, the air flow, as indicated by arrows B, is directed out through the outlet 35 and has a forward component of velocity. As will be described in greater detail below, the thrust reverser may also incorporate blocker doors rather than, or in addition to, the cooperating contours of the engine core cowl 22 and the translating cowl 20, in order to block the flow of air to the aft portion of the air duct and direct the air flow in a forward/outward direction.

Figure 3:
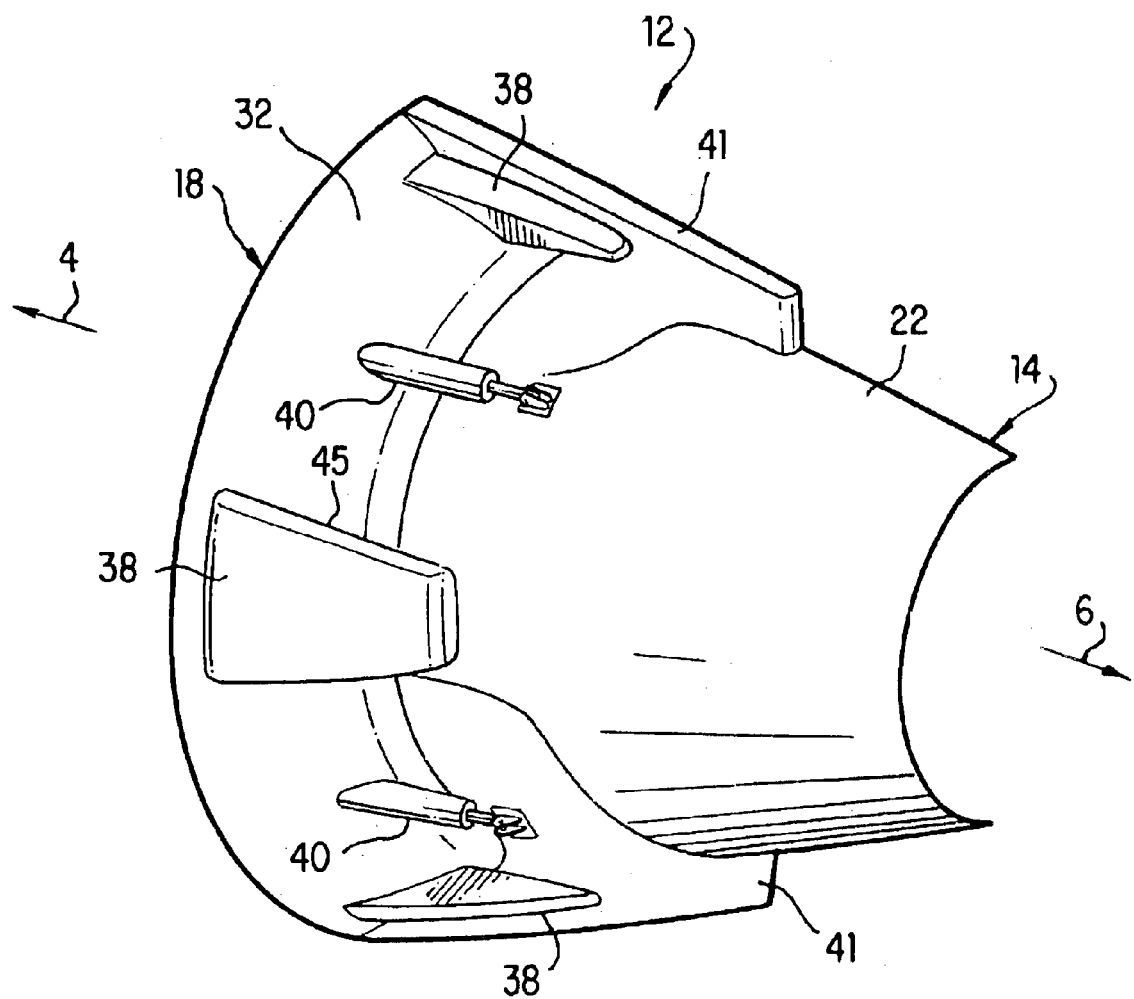
FIG. 3 is a perspective view of a portion (the fixed structure) of the thrust reverser, in accordance with the invention.
Figure 4:
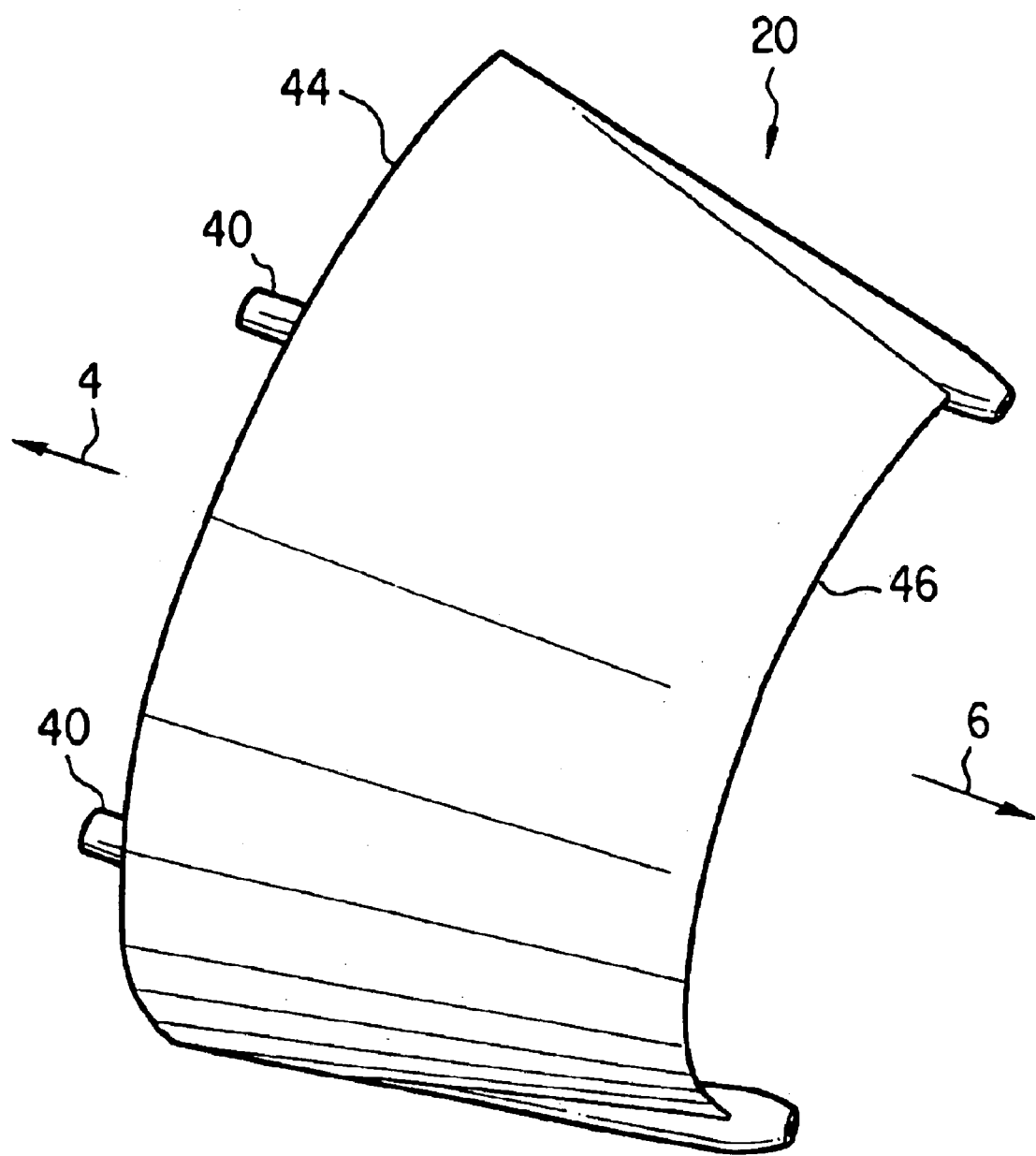
FIG. 4 is a perspective view of another portion (the translating cowl) of the thrust reverser, in accordance with the invention.
Figure 5:
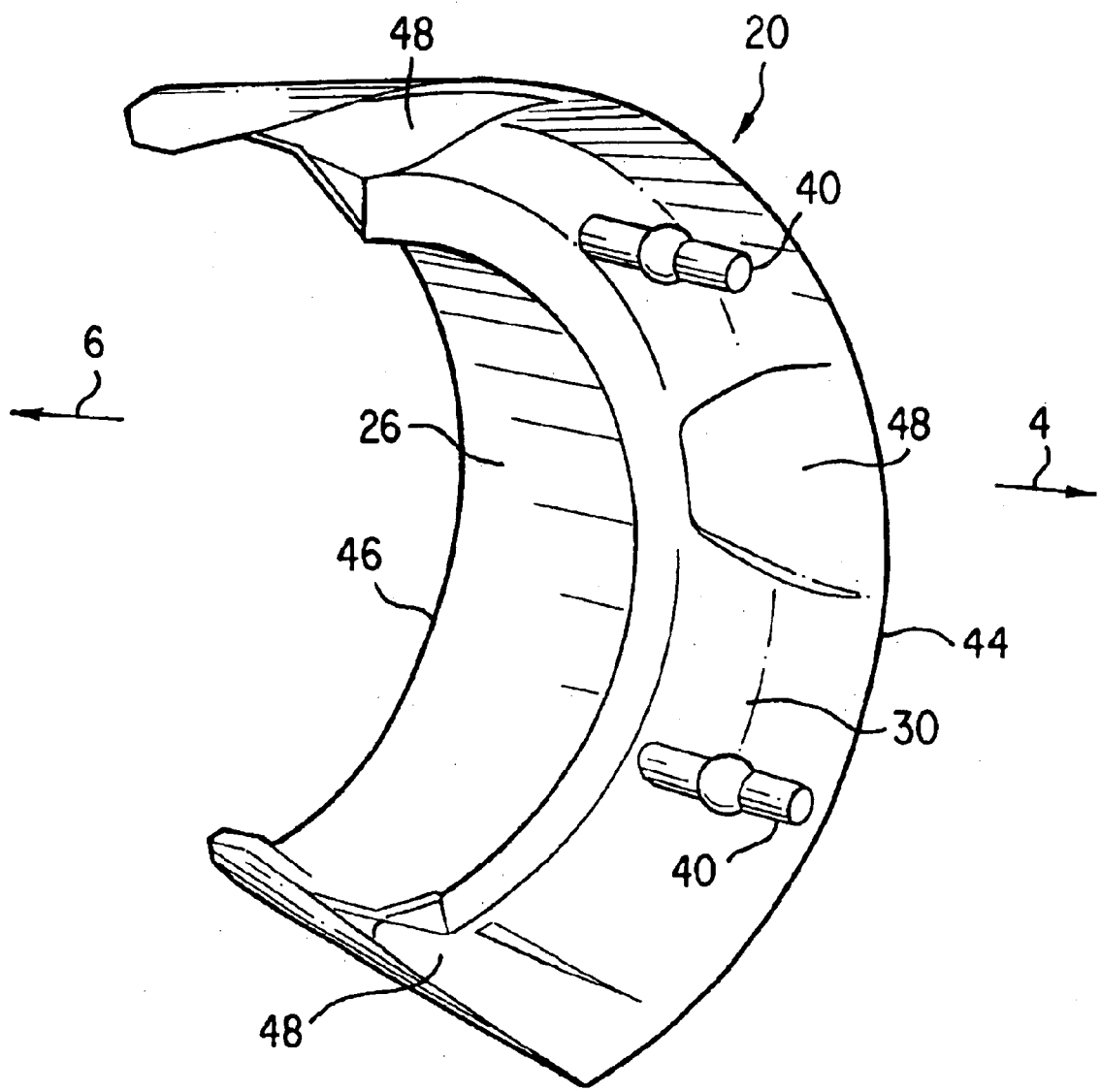
FIG. 5 is a perspective view of a portion (the translating cowl) of the thrust reverser illustrated in FIG. 4, in accordance with the invention.

Certain components of the thrust reverser 12 are illustrated in greater detail in FIGS. 3, 4, and 5. As illustrated in FIG. 3, the bulkhead 18 has a substantially annular shape and surrounds the external contour 22 of the engine 14, thereby defining the substantially annular air duct. Plume control devices 38 extend longitudinally across the outlet, and extend partially around the circumference of the thrust reverser 12. In the embodiment illustrated in FIG. 3, the plume control devices 38 extend in an aft direction from the bulkhead 18. Alternatively, the plume control devices may extend in a forward direction from translating cowl 20, or the plume control devices may span the entire length of the outlet and be supported at both fore and aft locations. Also illustrated are a series of actuators 40, which drive the translating cowl 20 between the closed (stowed) and open (deployed) positions. Such actuators are typically hydraulic or electric and well-known in the art. A fixed structure 41 provides support for the mounting of the bulkhead 18.

The translating cowl 20 is illustrated in FIGS. 4 and 5. The leading edge 44 of the translating cowl 20 cooperates with the corresponding edge of the bulkhead 18. The downstream wall 30 of the translating cowl 20 is shaped in order to direct the airflow in a forward direction and includes indentations 48 for receiving the plume control devices 38 when the translating cowl 20 is in the stowed position.

Figure 6:
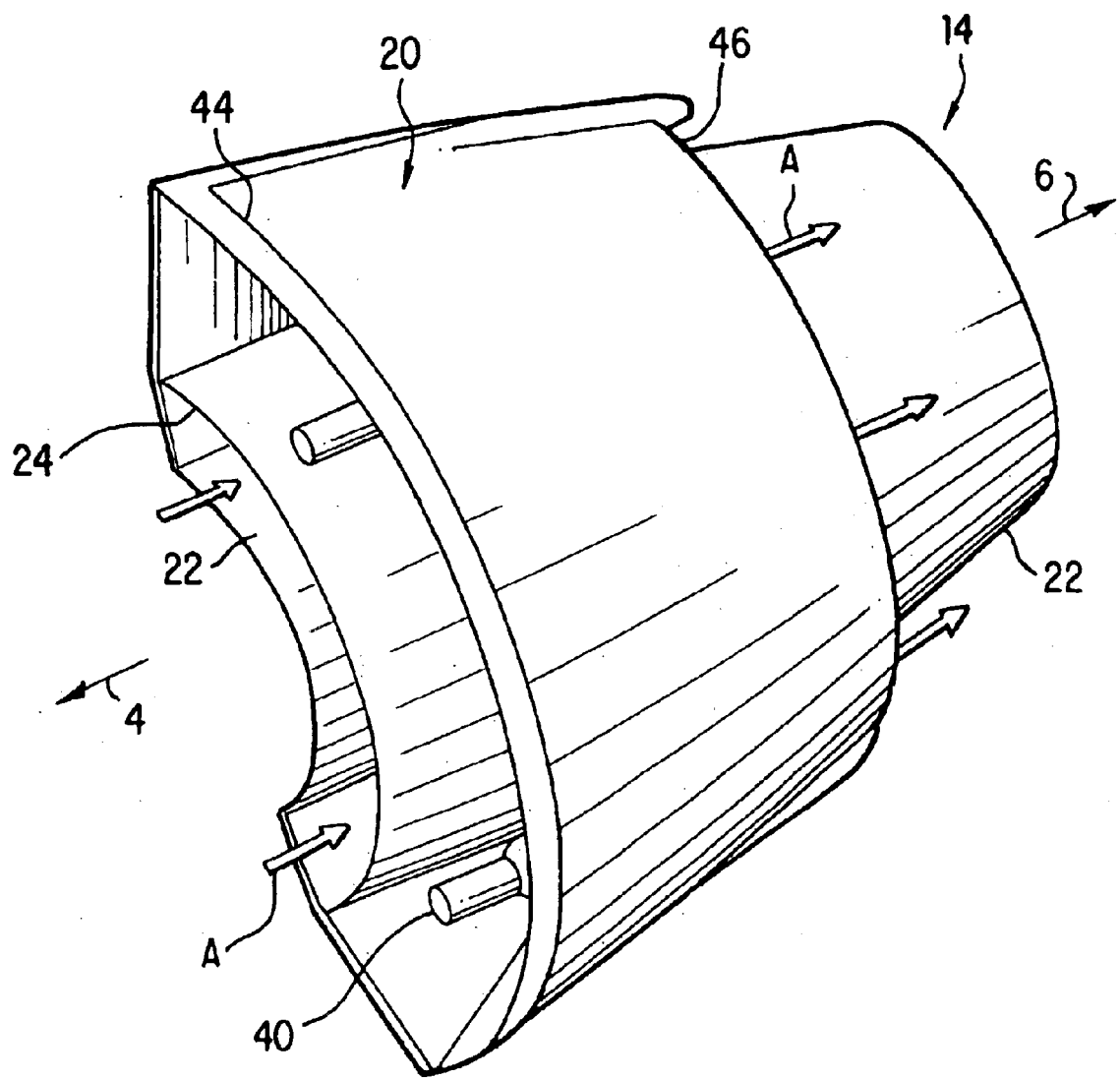
FIG. 6 is a perspective view of the thrust reverser half, in a closed position, in accordance with the invention.
Figure 7:
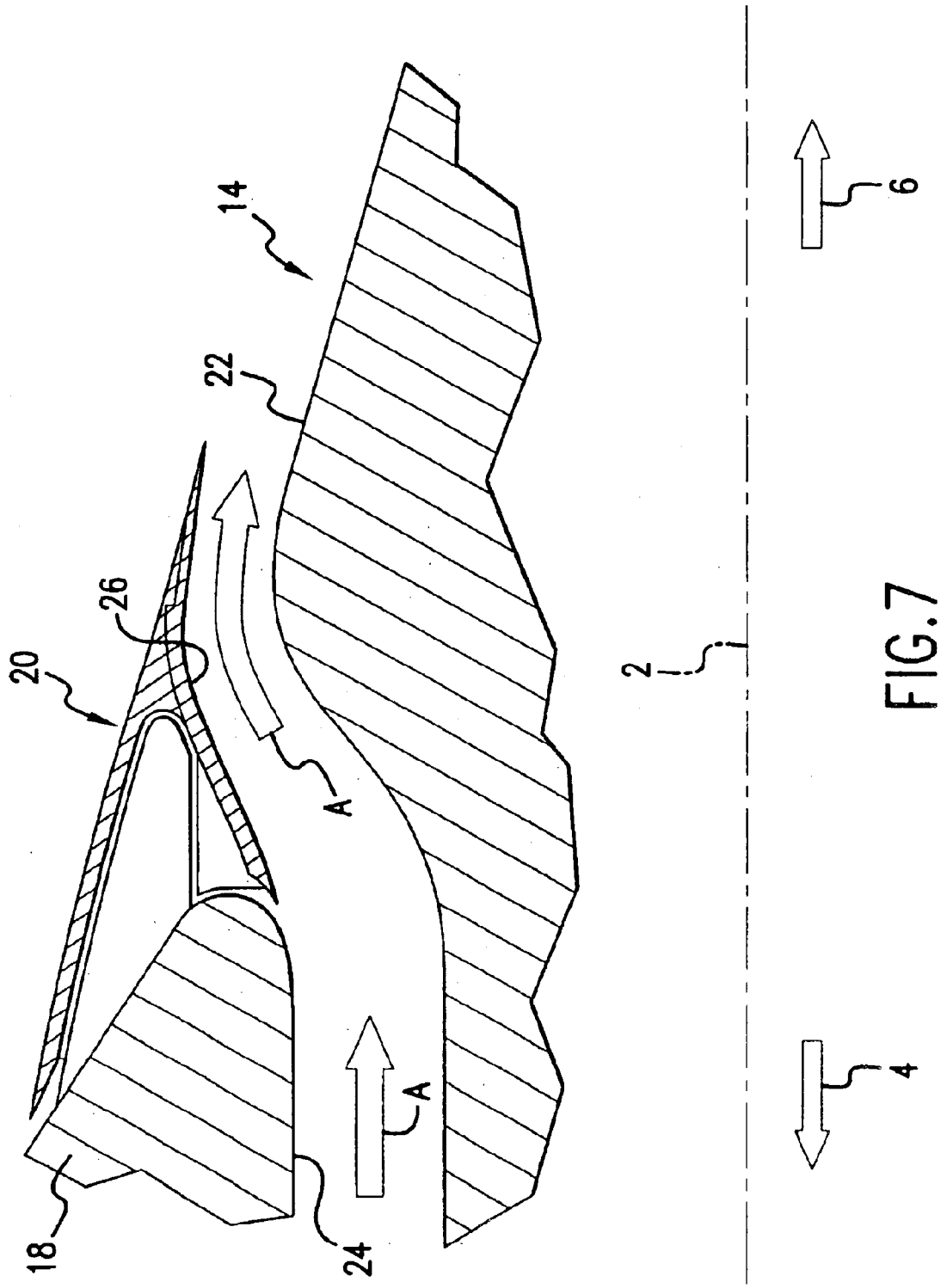
FIG. 7 is an enlarged longitudinal sectional view of the thrust reverser in a closed position, in accordance with the invention.

The thrust reverser 12 in the stowed configuration is illustrated in greater detail in FIGS. 6 and 7. The airflow through the air duct flow, as indicated by arrows A, flows substantially in the aft direction. The inner wall 24 of the fan cowl 16 and the inner wall 26 of the translating cowl 20 define the outward portion of the air duct. The inward portion of the air duct is defined by the core cowl 22 of the engine 14.

Figure 8:
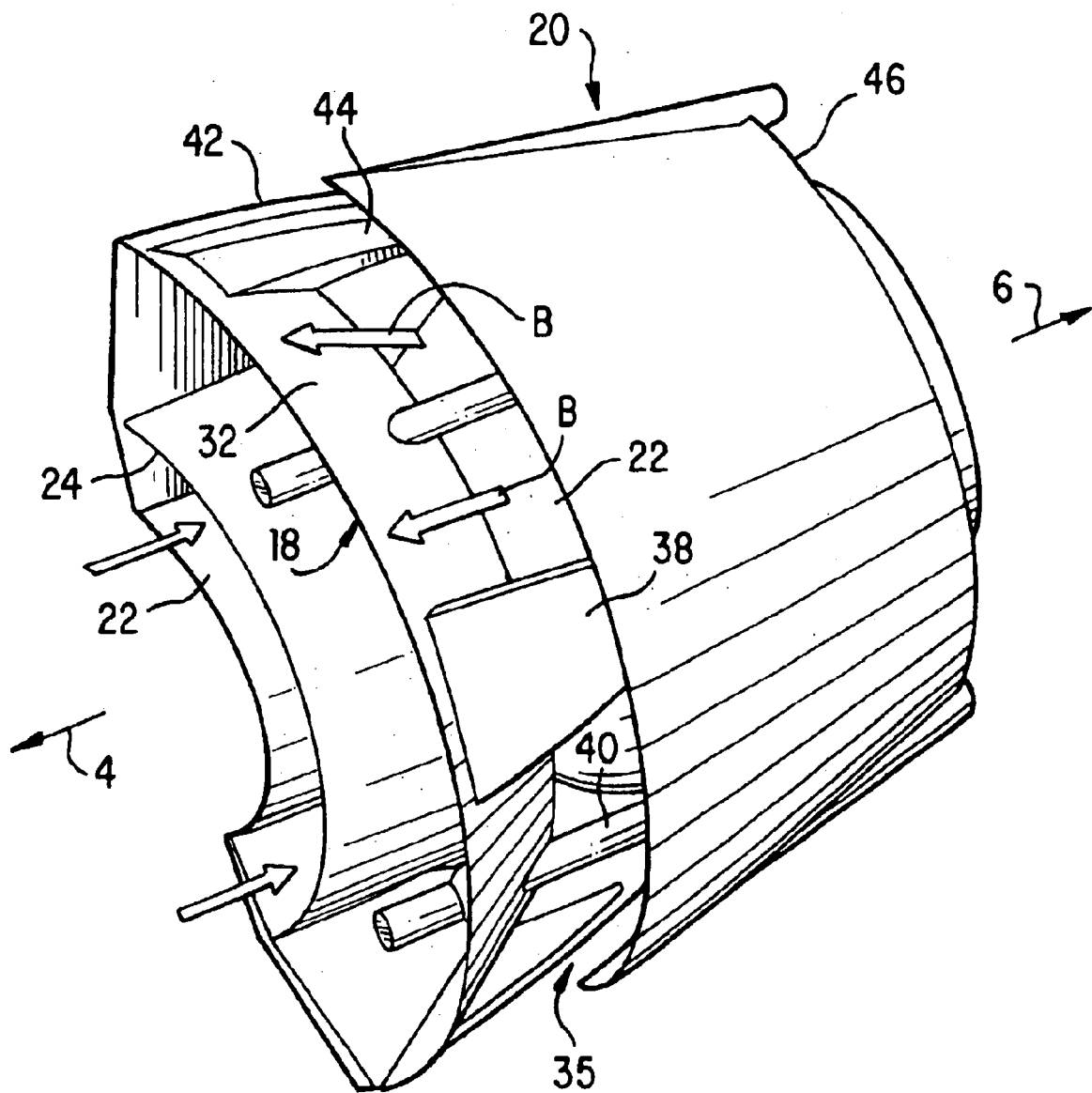
FIG. 8 is a perspective view of the thrust reverser half, in an open position, in accordance with the invention.
Figure 9:
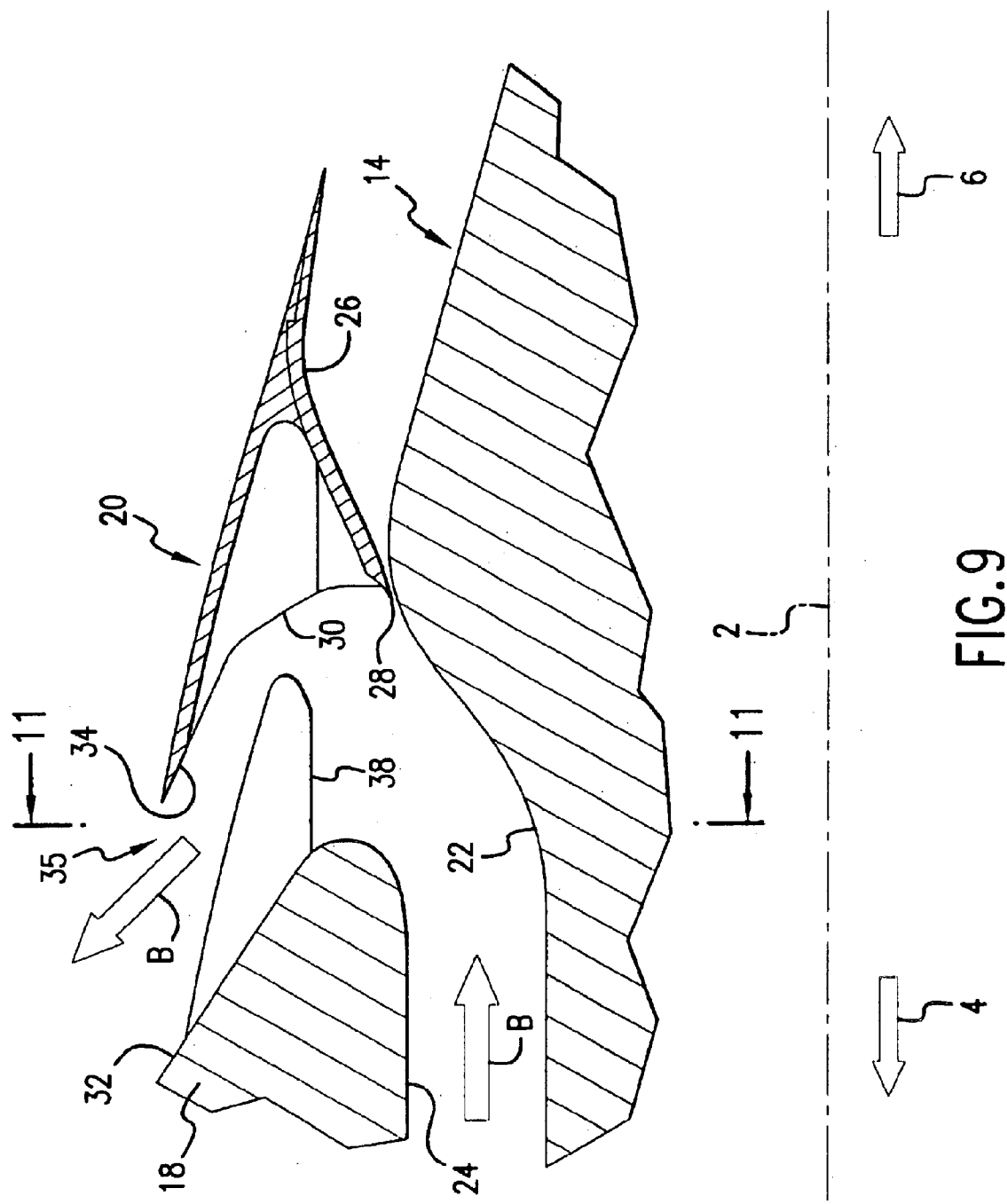
FIG. 9 is an enlarged longitudinal section view of the thrust reverser in an open position, in accordance with the invention.
Figure 10:
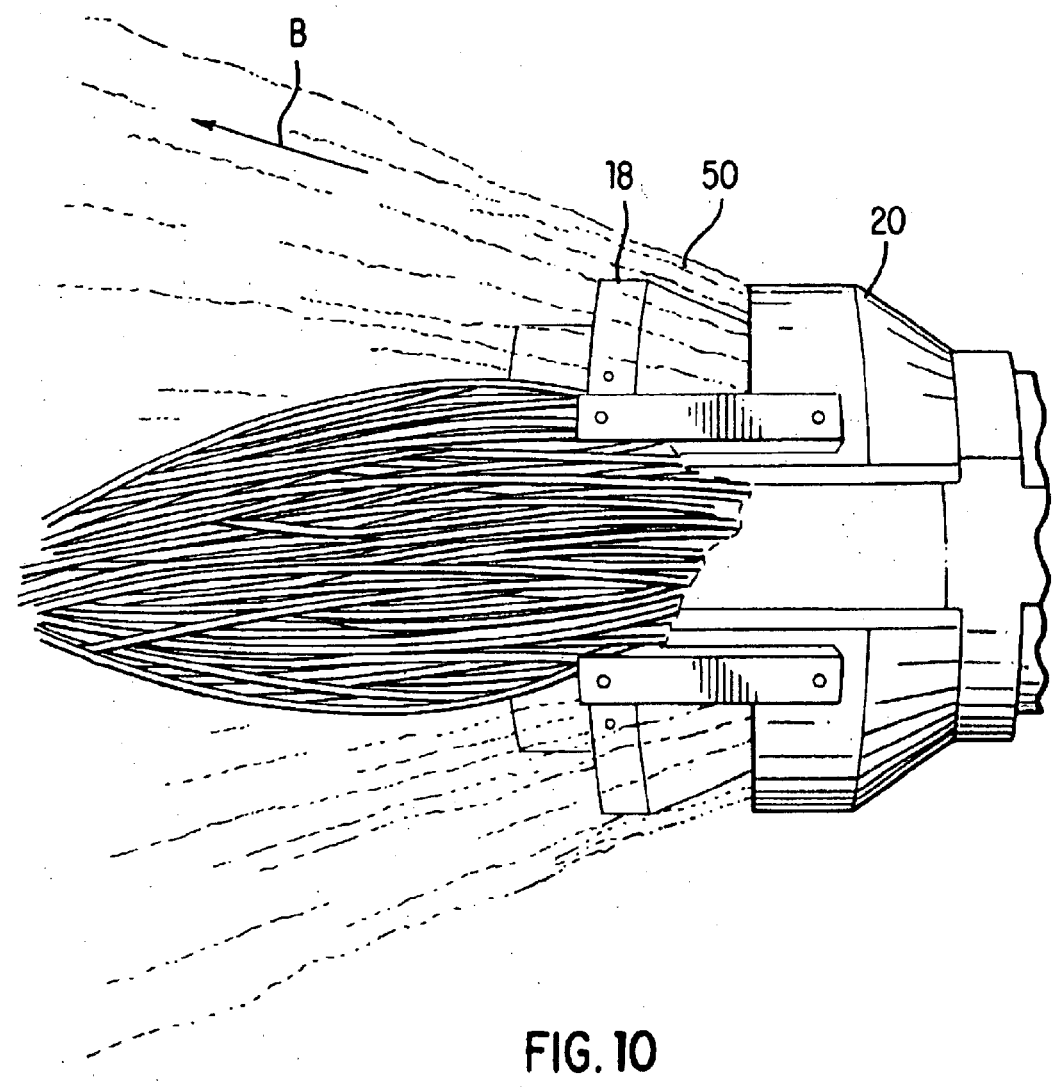
FIG. 10 is a side view of a scale model test bed of the thrust reverser in the open configuration, in accordance with the invention.

The thrust reverser in the deployed configuration is illustrated in greater detail in FIGS. 8 and 9, (and in the test bed configuration illustrated in FIG. 10). As described above, when the translating cowl 20 moves to the deployed position, the downstream wall 30 of the translating cowl 20, the ramp portion 32 of the bulkhead 18, and the plume control devices 38 are exposed to the air flow. Due to the shape of the downstream wall 30 and the ramp portion 32, the air flow exits the thrust reverser 12 with a forward component as indicated by arrows B. The downstream wall 30 of the translating cowl 20 may also incorporate an extension, or "kicker plate" 34, which assists in directing the flow in a forward direction, and will be described in greater detail below.

Figure 11:
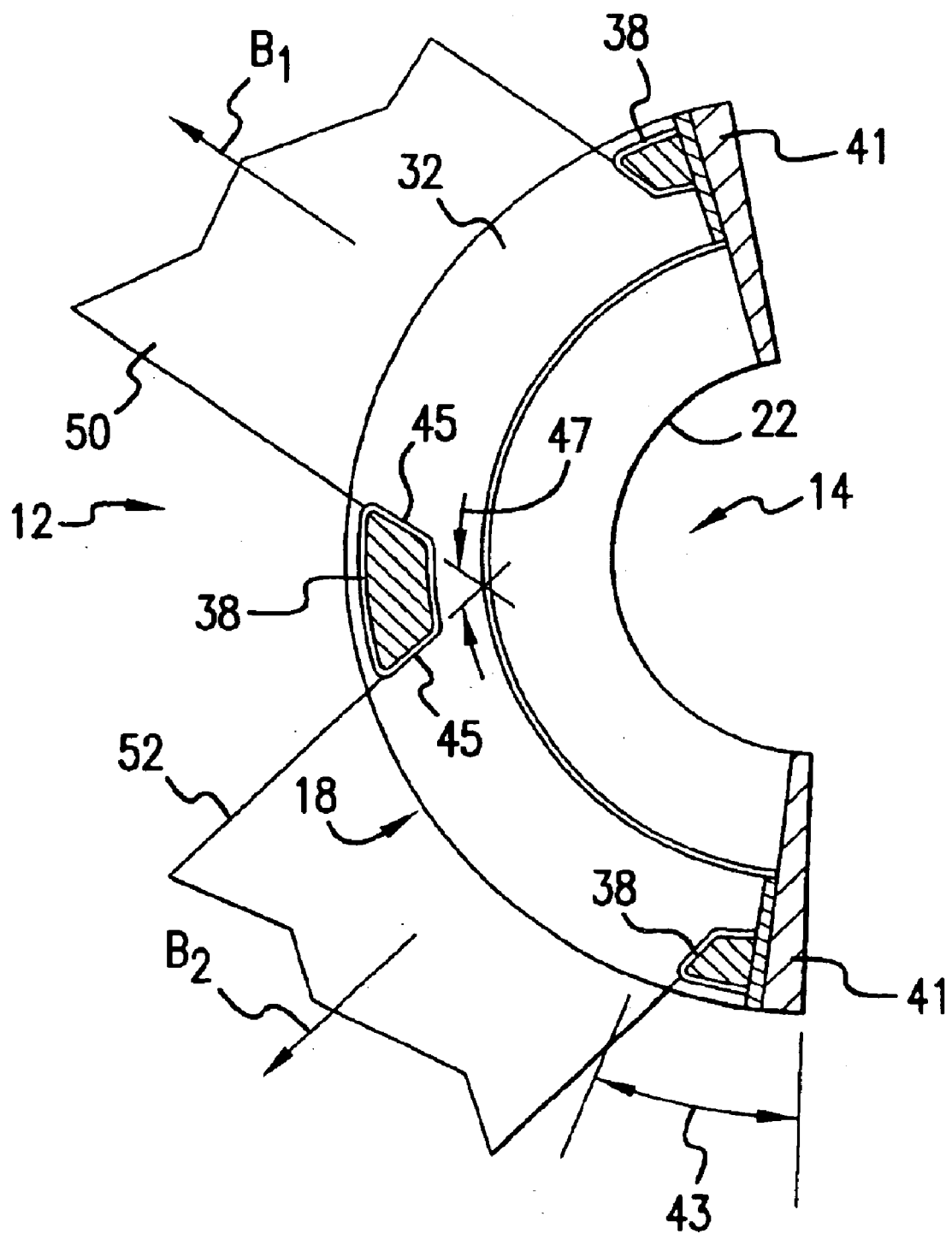
FIG. 11 is an axial sectional view of the thrust reverser, taken from line 11—11 of FIG. 9 in accordance with the invention.

Several plume control devices 38, as illustrated in FIG. 11 (and in the test bed scale model illustrated in FIG. 12), provide additional control to the airflow in a radial direction (perpendicular to the forward direction 4 and the aft direction 6) to minimize the flow impinging upon the fuselage and control surfaces of the aircraft, which may affect their effectiveness. As illustrated in the figure, a portion of the air flow emerging from the thrust reverser 12 passes around the plume control device 38, and is diverted into plume 50 in the direction indicated by arrow $B_1$. Another portion of the air flow emerging from the thrust reverser 12 passes around the plume control device 38, and is diverted into plume 52 in the directions indicated by arrow $B_2$. The shape 47 of the walls 45 of the plume control device 38 assist in determining the direction of the diverted flow.

Figure 13:
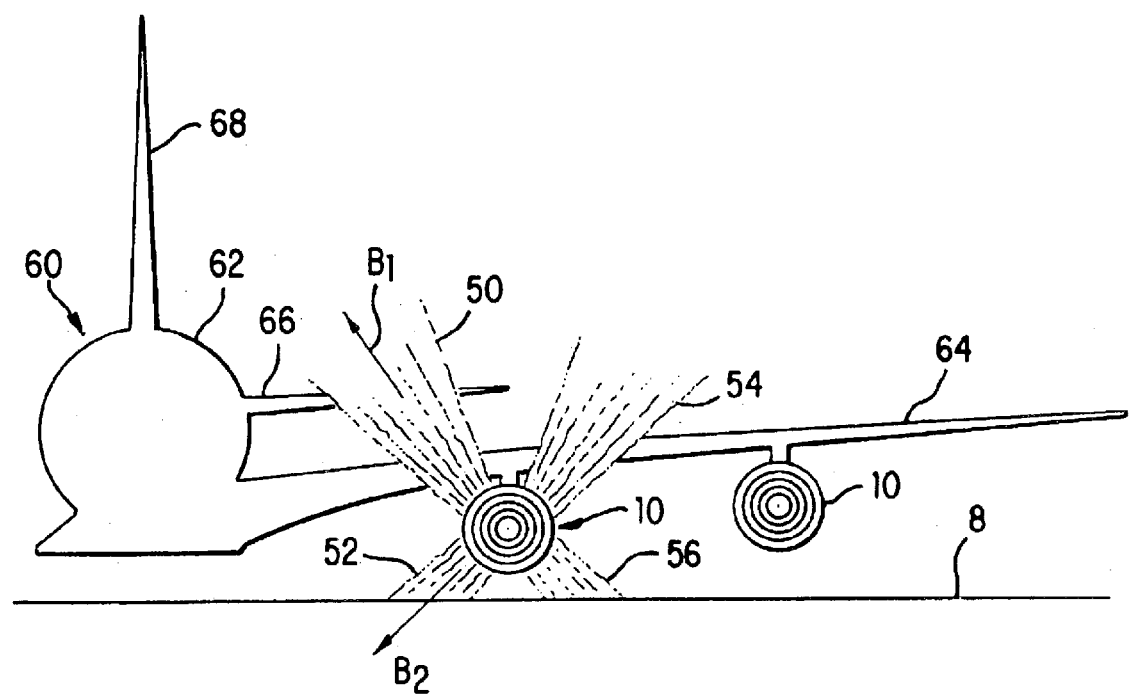
FIG. 13 is an end view of the nacelle and thrust reverser mounted to an aircraft in accordance with the invention.

FIG. 13 illustrates the exemplary nacelles 10 as mounted with respect to an aircraft 60, and indicating the relationship of the plumes 50, 52, 54, and 56 with the fuselage 62, the wing 64, the elevator 66, and the rudder 68. The plane of the runway 8 is also illustrated. The plumes 50, 52 are directed by the plume control devices 38 (not shown in FIG. 13) to minimize impingement with the fuselage 62. The plumes 54, 56 are directed to minimize cross ingestion into and impingement on the adjacent nacelle 10. The resulting plumes 50, 52, 54, and 56 minimize any adverse affect on aircraft stability and controllability during landing.

Figure 14:
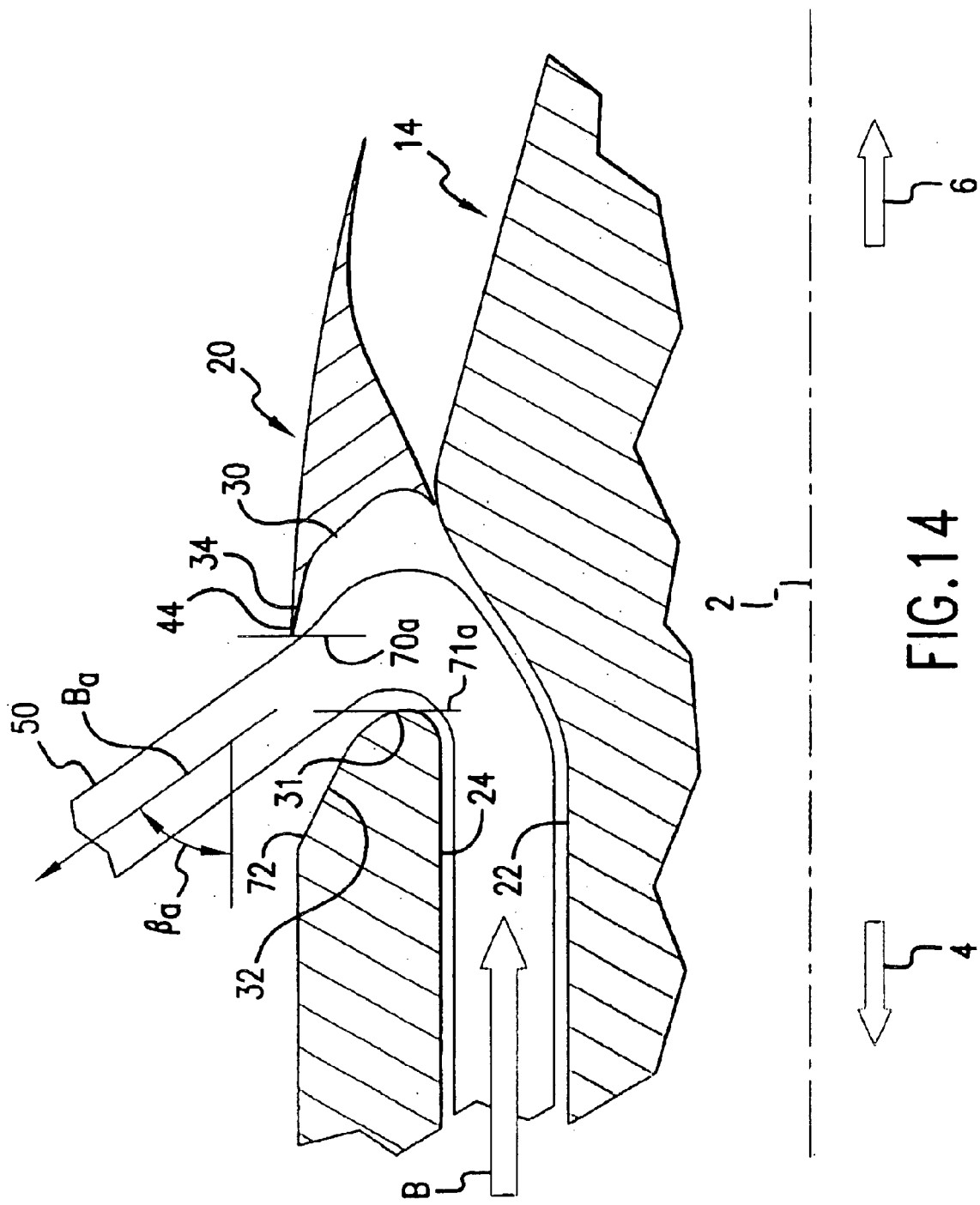
FIG. 14 is a longitudinal sectional view, similar to FIG. 9, illustrating the kicker plate assembly and flow pattern at one radial location about the thrust reverser circumference, in accordance with the invention.
Figure 15:
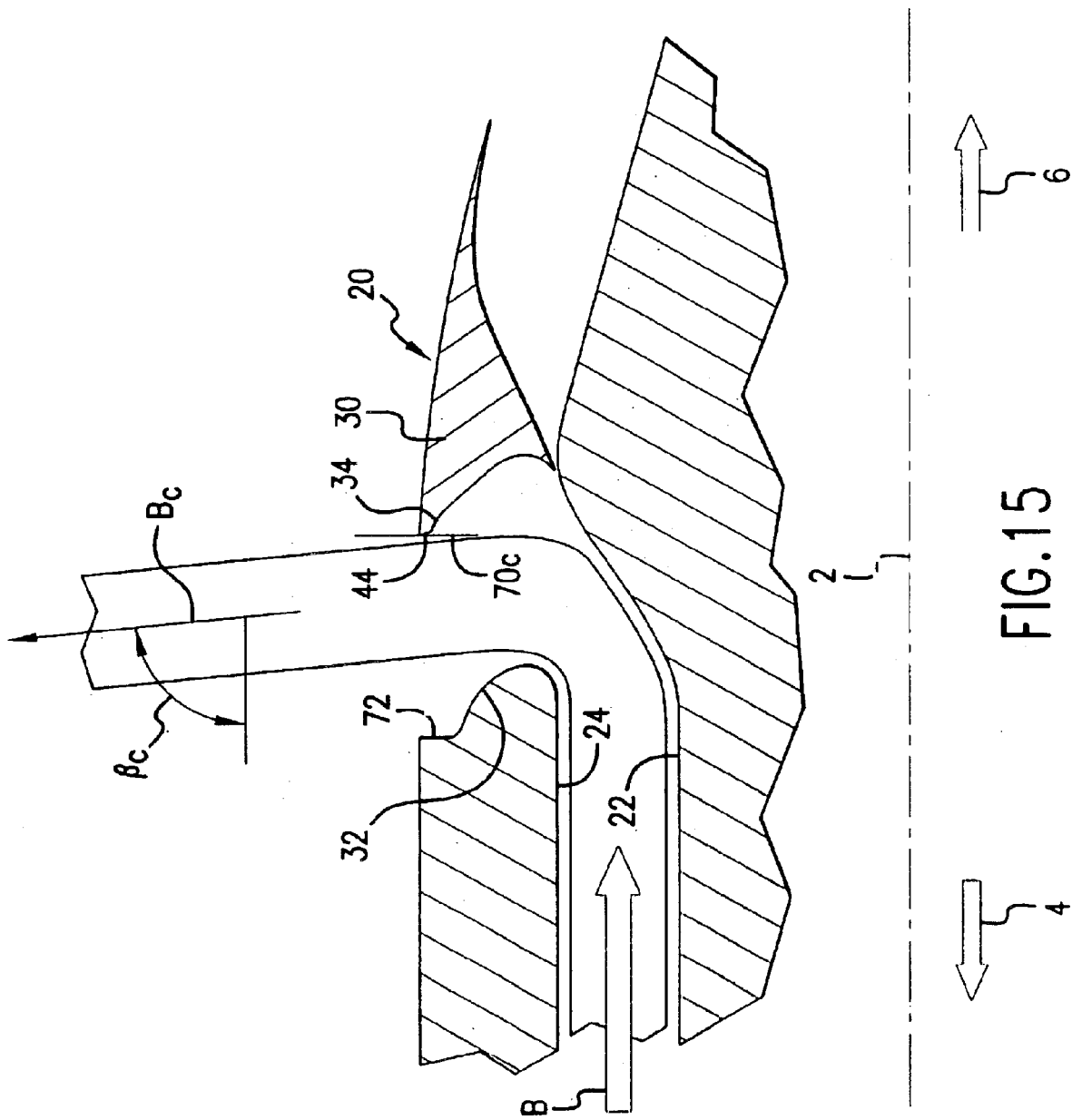
FIG. 15 is a longitudinal sectional view, similar to FIG. 14, illustrating the kicker plate assembly and flow pattern at another radial location about the thrust reverser circumference, in accordance with the invention.
Figure 16:
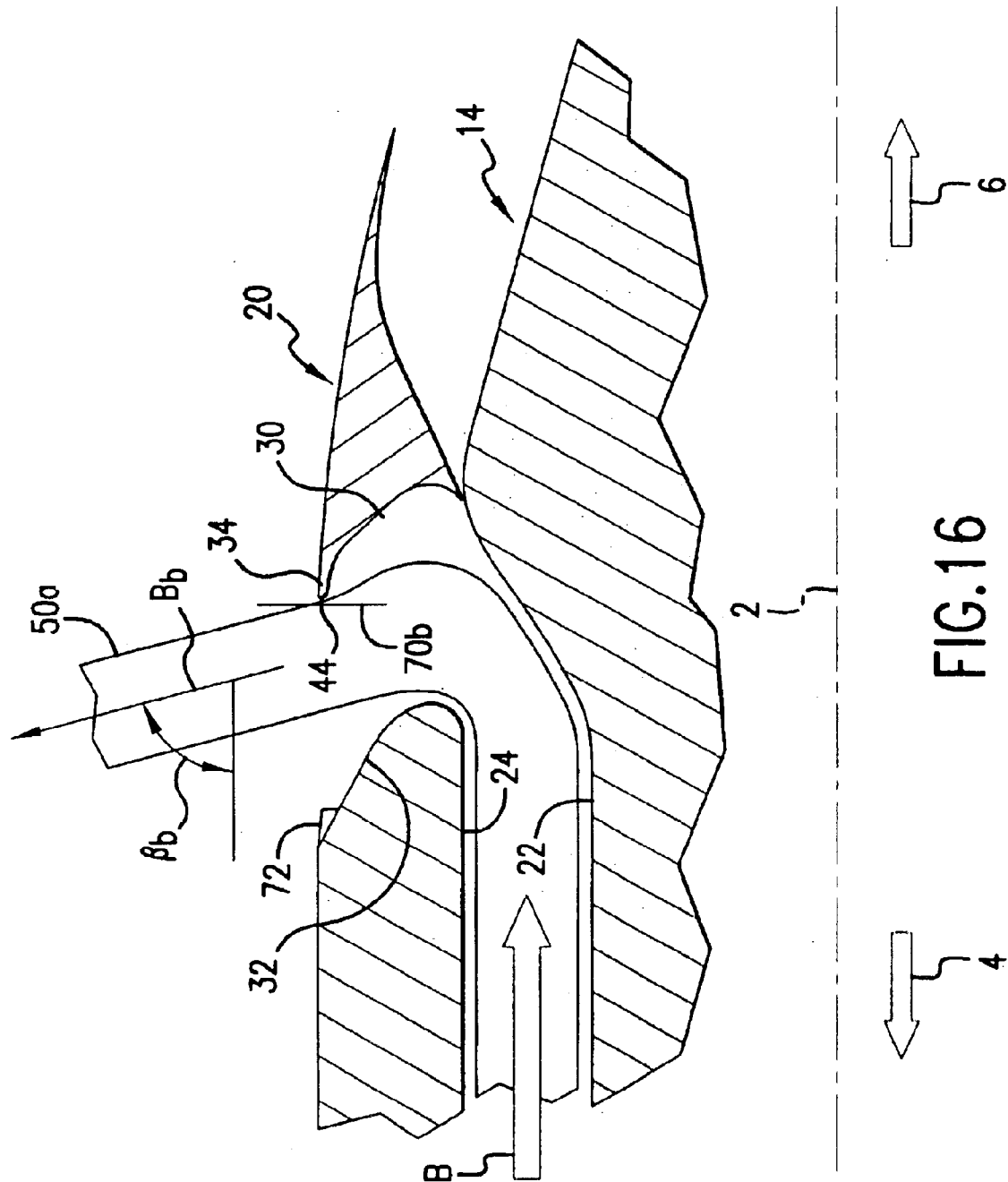
FIG. 16 is a longitudinal sectional view, similar to FIG. 15, illustrating the kicker plate assembly and flow pattern at a further radial location about the thrust reverser circumference, in accordance with the invention.

The kicker plate 34, as described above, is an extension to the upstream wall 30 of the translating cowl 20, and provides an increased forward component to the flow. The amount of the forward component is determined, in part, by the dimensions and shape of the kicker plate 34. Varying the length of the kicker plate 34 may allow for controlling the extent of forward turning of flow. The length of the kicker plate may vary in order to satisfy both engine and aircraft requirements such as area match (and engine requirement), reingestion, cross ingestion, impingement and aircraft controllability during the landing run. FIGS. 14–16 are taken at different radial locations about the circumference of the thrust reverser 12. (For clarity, the plume control devices 38 have been omitted from FIGS. 14–16.) As illustrated in FIGS. 14–16, the kicker plate 34 and the corresponding bulkhead surface 72 may have varying dimensions at different radial locations about the periphery of the translating cowl 20, and similarly the leading edge 44 of the translating cowl 20 may be located at different station planes 70a, 70b, 70c (which is an expression of the location of the leading edge 44 along the longitudinal axis of the aircraft).

In FIG. 14, the kicker plate 34 has the longest dimension, and the station plane 70a of the leading edge 44 is located furthest forward (when compared with FIGS. 15–16). The contour of bulkhead 72 which cooperates with the leading edge 44 of the kicker plate 34 is also located at its most forward location. Consequently, the direction of flow $B_a$ of the plume 50 leaving the thrust reverser 12 has the greatest forward component, and the angle $\beta_a$ (defined as the angle between the longitudinal axis and the direction of flow $B_a$) is the smallest (when compared with FIGS. 15–16). The kicker plate configuration of FIG. 14 may be used entirely about the circumference provided that the reverse plume has no adverse effect on controllability, impingement and ingestion. In one embodiment, the length of the kicker plate illustrated in FIG. 14 is used throughout the circumference of the thrust reverser 12, except for the bottom portion, e.g., region 43, as illustrated in FIG. 11, which may represent approximately 45° of the total circumference of the thrust reverser In FIG. 15, the kicker plate 34 has the shortest dimension, and the station plane 70c of the leading edge 44 is located furthest aft (when compared with FIGS. 14 and 16). The contour of bulkhead 72 which cooperates with leading edge 44 is located furthest aft. The direction of flow Bc of the plume 50 has the smallest forward component, and the angle $\beta_c$ (defined as the angle between the longitudinal axis and the direction of flow $B_c$) is the largest (when compared with FIGS. 14 and 16). As discussed above, this kicker plate length may be used in the lower 45 degrees of the reverser. In FIG. 16, the kicker plate 34 has an intermediate length, and an intermediate station location 70b. The contour of bulkhead 72 is also at an intermediate location. Similarly, the direction of flow $B_b$ has an intermediate forward component, and the angle $\beta_b$ (defined as the angle between the longitudinal axis and the direction of flow $B_b$) is intermediate (when compared with FIGS. 14 and 15). Depending upon the thrust requirements of the engine 10, the region 43 of the thrust reverser 12 (see FIG. 11) may have a kicker plate configuration corresponding to FIG. 15, or that of FIG. 16, or both. The dimensions of the kicker plate would be gradually tapered between the lengths illustrated in FIGS. 14–16.

Figure 17:
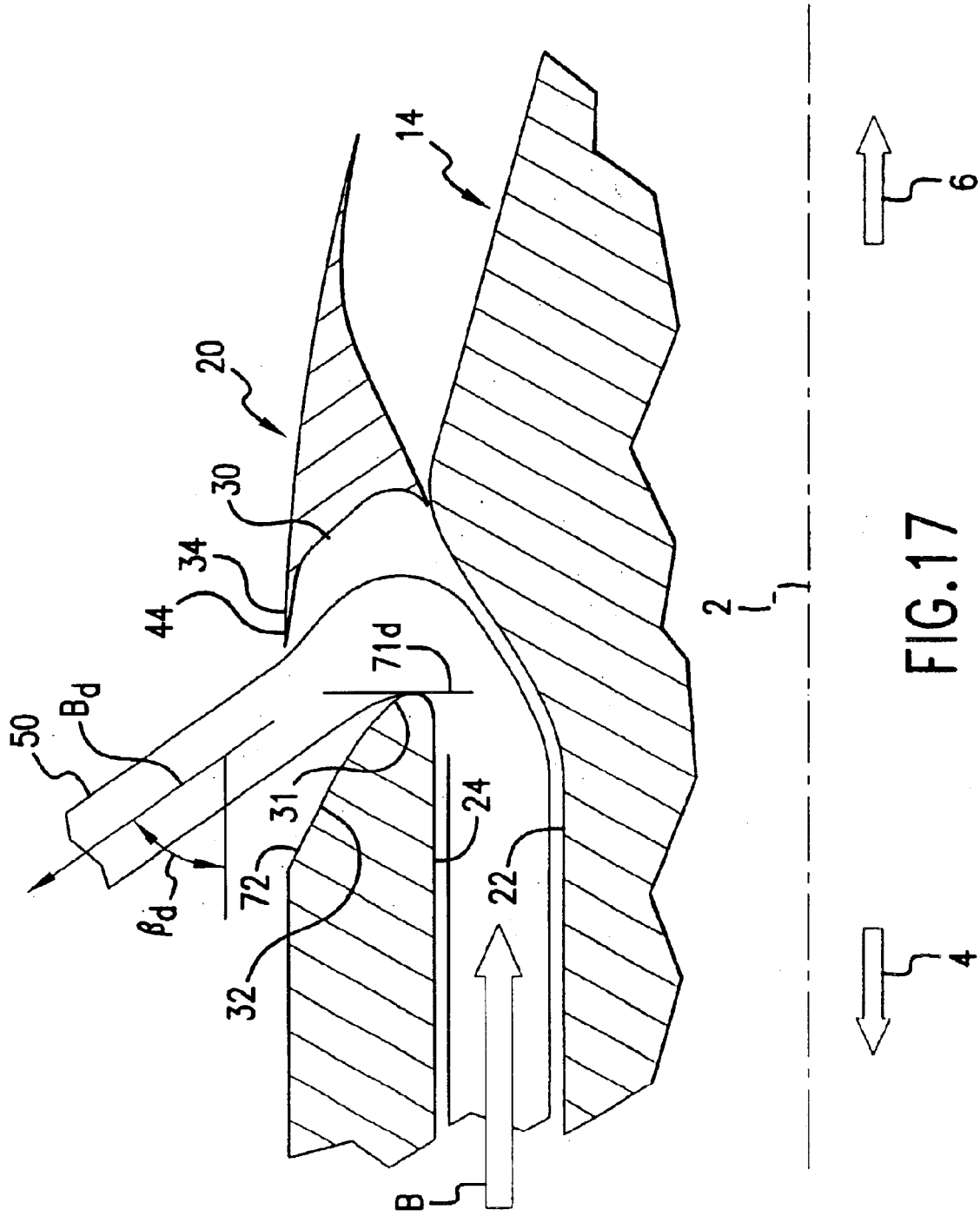
FIG. 17 is a longitudinal sectional view, similar to FIG. 14, illustrating the ramp portion of the bulkhead at another radial location about the thrust reverser circumference, in accordance with the invention.

In FIGS. 14 and 17, the dimension of the nose portion 31 of the bulkhead 18 also varies about the circumference of the engine 10. In FIG. 14, the nose portion 31 has the shortest dimension, and the station plane 71a of the nose portion 31 is located furthest forward. In FIG. 17, the nose portion 31 has the longest dimension, and the station plane 71d of the nose portion 31 is located furthest aft. The direction of flow $B_d$ of the plume 50 has a larger forward component, and the angle $\beta_d$ (defined as the angle between the longitudinal axis and the direction of flow $B_d$) is smaller as the dimension of the nose portion 31 is increased (i.e., the station plane of the nose portion moves further aft). The plume control devices 38 and the variable-length kicker plate 34 may be varied independently of the nose portion to provide the ability to tailor the plume exiting the thrust reverser 12. In a different embodiment of the thrust reverser (not shown), the plume control devices 38 are omitted, and the control of the plume is solely provided by varying the dimensions of the nose portion 31 at different axial positions about the circumference of the bulkhead 18.

Figure 18:
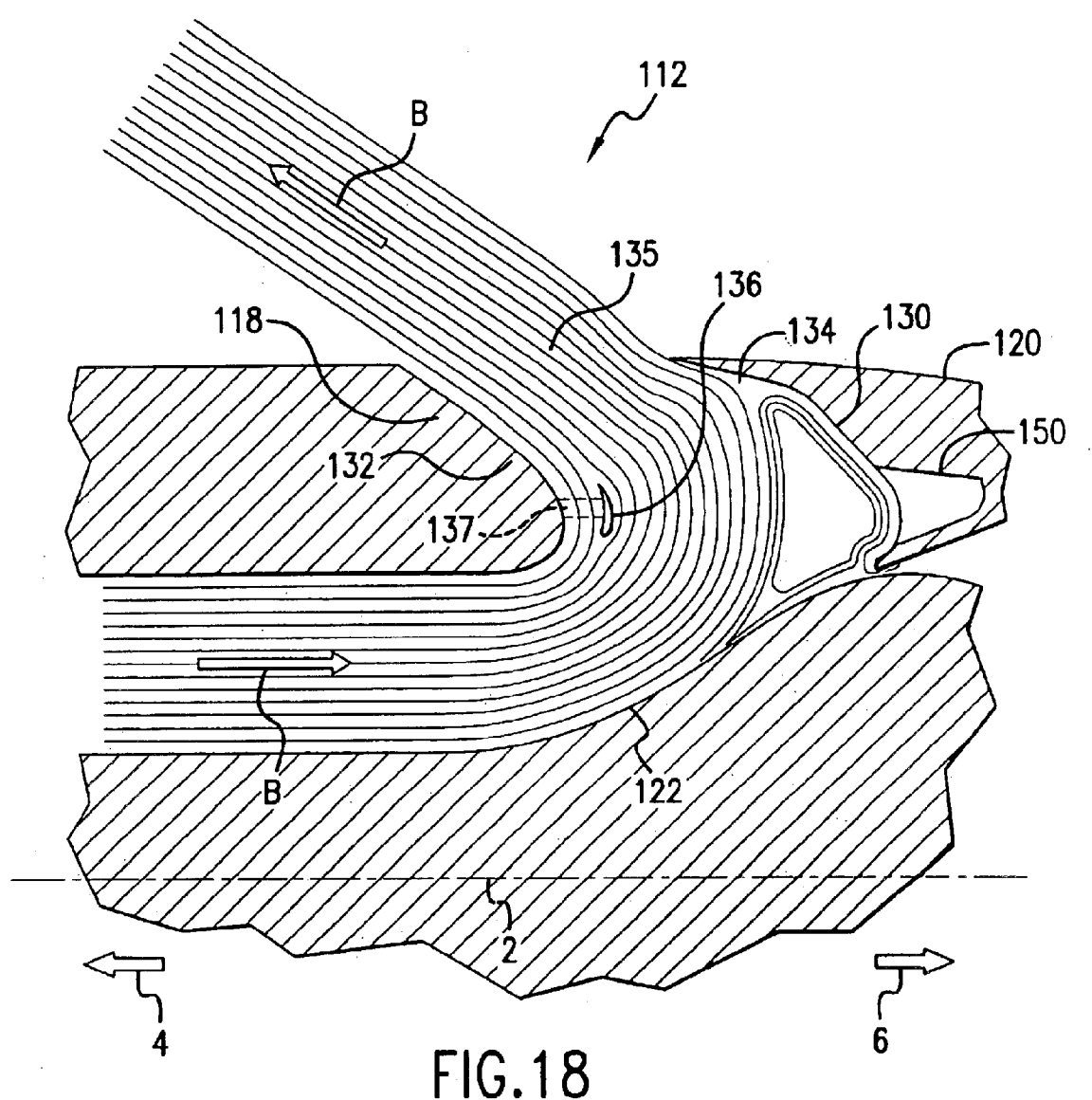
FIG. 18 is a longitudinal sectional view similar to FIG. 9, of another embodiment of a thrust reverser in accordance with the invention.

Another embodiment of the thrust reverser is illustrated in FIG. 18. Thrust reverser 112 is substantially identical to thrust reverser 12, with the differences noted herein. Thrust reverser 112 adds a vane element, or vane ring 136, supported at several discrete locations by support members 137 (illustrated in dashed line) extending from bulkhead 118 and spaced axially apart from the ramp portion 132 of bulkhead 118 in an aft direction. A cavity 150 is provided at the forward end of the cowl 120 to house vane 136 (if used) when the cowl is in the stowed position. The vane element 136 preferably has an airfoil section and helps prevent premature separation of flow around ramp portion 132. This improves both forward turning and increases the flow through the opening. Vane element 136 thus guides air to the outlet 135 when the translating cowl 120 is in the open position. The optimum shape of the vane cross-section is highly dependent on local geometries and flow characteristics. The vane element 136 is preferably constructed as a ring segment corresponding to the annular shape of the ramp portion 132 of bulkhead 118.

Figure 20:
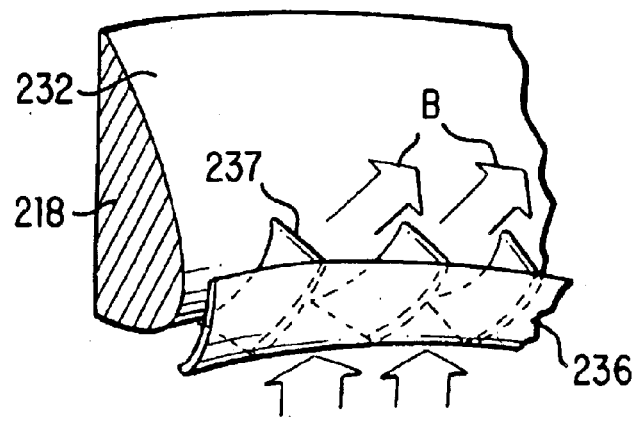
FIG. 20 is an enlarged perspective view, in partial section, of a portion of the embodiment illustrated in FIG. 19, in accordance with the invention.
Figure 19:
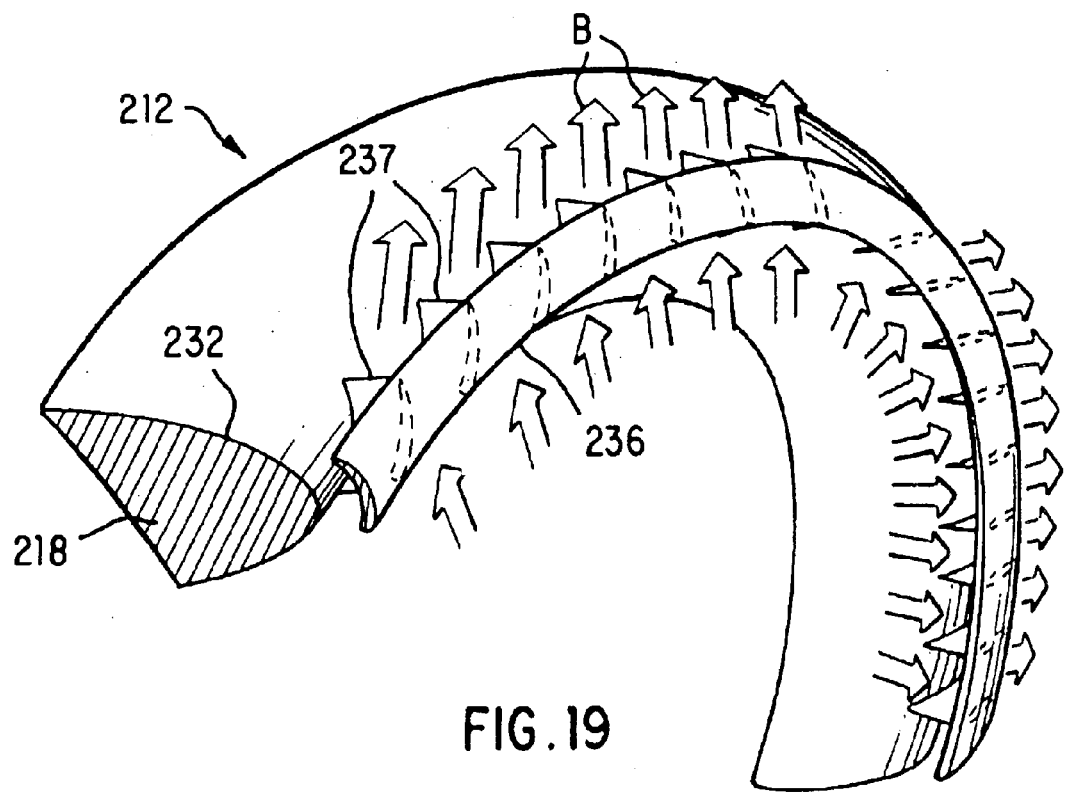
FIG. 19 is a perspective view, in partial section, of a portion of another embodiment of the thrust reverser, in accordance with the invention.

FIGS. 19–20 illustrate another embodiment of the thrust reverser, which is substantially identical to thrust reverser 112 illustrated in FIG. 18, with the following differences noted herein. (The translating cowl and engine have been omitted from FIGS. 19–20 for clarity.) Thrust reverser 212 includes a vane element 236 which helps prevent premature separation of the flow through the opening. In this embodiment, vane 236 is supported by a plurality of vane supports 237. As is clearly illustrated in FIG. 20, the vane supports 237 may have a airfoil cross-section and are oriented in the flow in order to provide additional radial control of the flow passing between the ramp portion 232 and the vane element 236.

Figure 21:
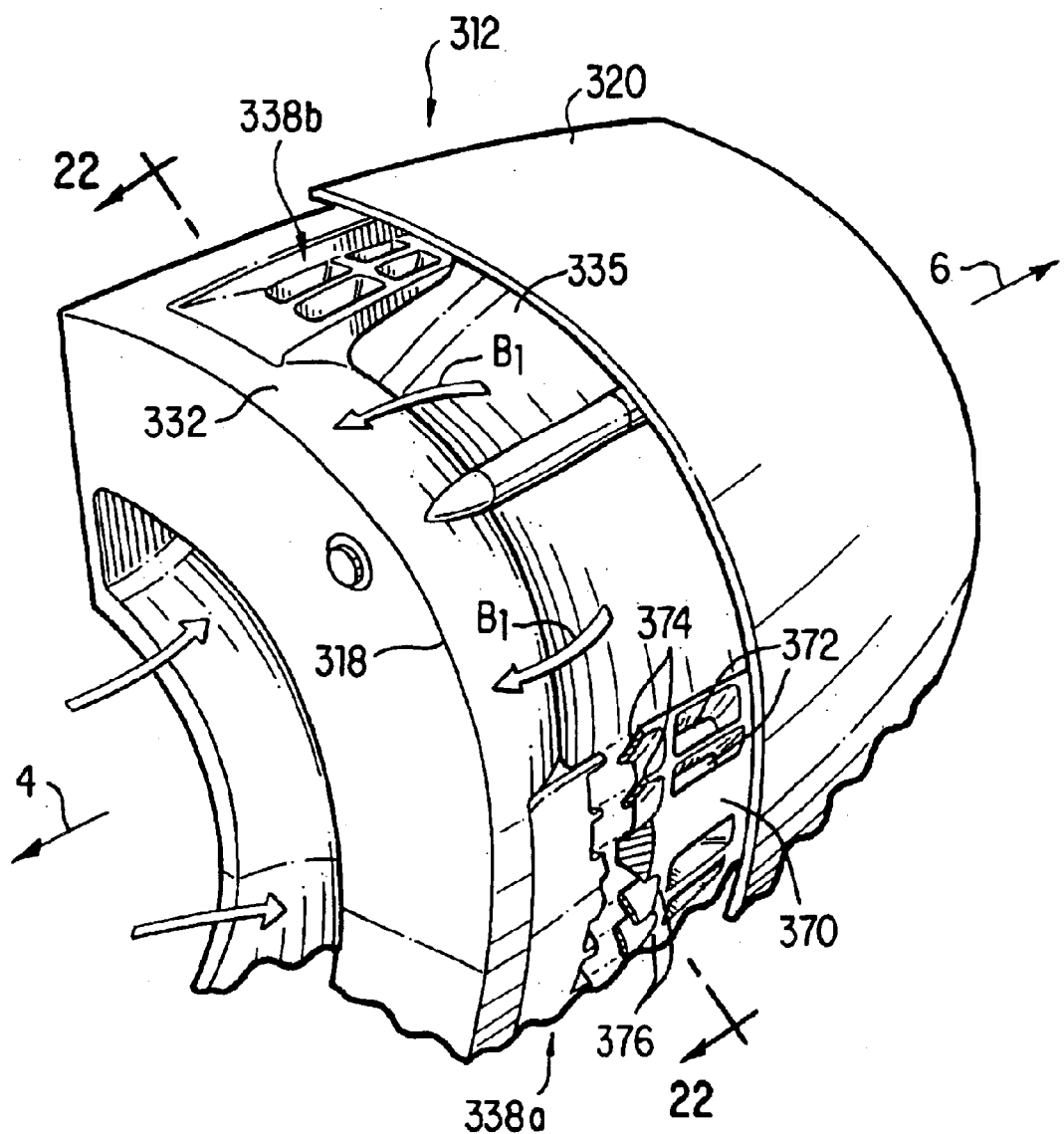
FIG. 21 is a perspective view similar to FIG. 8 of another embodiment of the thrust reverser, in an open position, in accordance with the invention.
Figure 22:
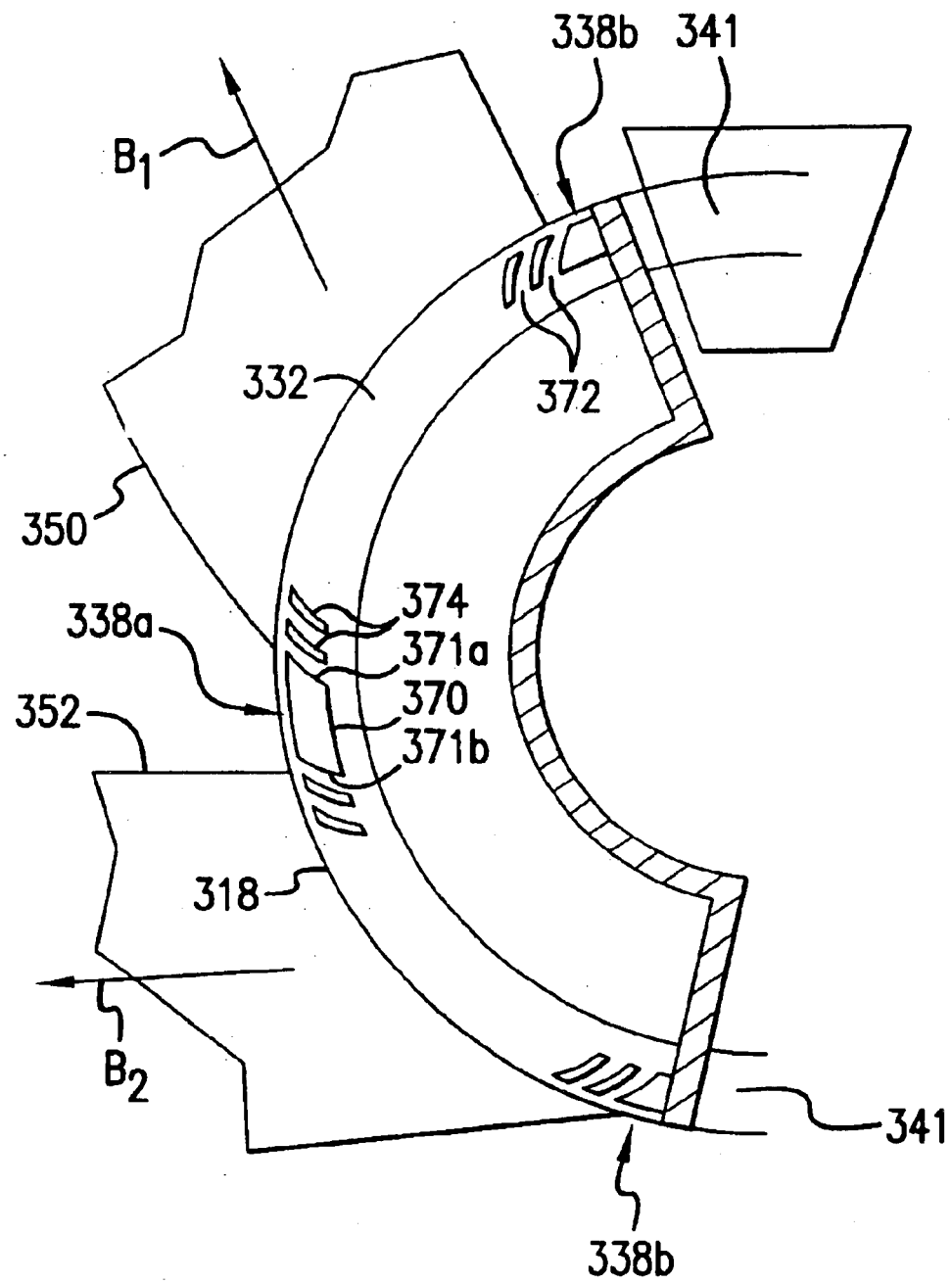
FIG. 22 is an axial sectional view of the thrust reverser of FIG. 21, taken from line 22—22 of FIG. 21 in accordance with the invention.

Another embodiment which incorporates a plume control device is illustrated in FIGS. 21–22, and is substantially identical to the thrust reverser 12 having the plume control devices 38 illustrated in FIG. 8 and 11, with the following differences noted herein. As with plume control device 38, plume control devices 338a 338b and 338c provide additional control to the airflow in a radial direction (perpendicular to the forward direction 4 and the aft direction 6) to minimize the flow impinging upon the fuselage and control surfaces of the aircraft, which may affect their effectiveness. As with plume control device 38, plume control devices 338a, 338b, and 338c extend only partially about the circumference of the thrust reverser 12. In addition, plume control devices 338a 338b and 338c also provide additional forward thrust as will be described herein.

As illustrated in FIG. 21, plume control devices 338a and 338b extend across the opening 335 defined when the translating cowl 320 is in the open position. In FIG. 21, plume control devices 33a and 338b extend aft from the bulkhead 318. A portion of the air flow $B_1$ emerging from the thrust reverser 312 is directed in a forward direction by the ramp portion 332 of the bulkhead 318 and the wall (not shown) of the translating cowl 320, substantially as described above regarding FIGS. 9–10 and 14–17. A portion of the air flow passes around the plume control devices 338a and 338b, and is diverted into plume 350 in the direction indicated by arrow $B_1$. As illustrated in FIG. 22, another portion of the air flow emerging from the thrust reverser 312 passes around the plume control devices 338a and 338c, and is diverted into plume 352 in the direction indicated by arrow $B_2$.

The shape of the plume control devices 338a 338b and 338c assist in determining the direction of the diverted flow. As illustrated in FIGS. 21–22, plume control devices 338a 338b and 338c have a wall portion 370 having edge portions 371a and 371b. As with edge portions 45 of plume control device 38, edge portions 371a and 371b assist in directing the airflow of the plumes, e.g., plumes 350 and 352. Edge portions 371a and 371b assist in directing the airflow in a radial direction, e.g., directions $B_1$ and $B_2$. A series of cells 372 is also defined in the plume control devices 338a, 338b, and 338c. Each cell 372 is formed by a series of longitudinal vanes 374 and a series of axial vanes 376. As can be clearly seen in FIG. 22, longitudinal vanes 374 are aligned in the airflow to provide additional radial control of the plumes. Cells 372 also provide additional forward thrust to the thrust reverser 312. Axial vanes 376 (illustrated in FIG. 21) provide such forward thrust the flow passing through cells 372.

Figure 12:
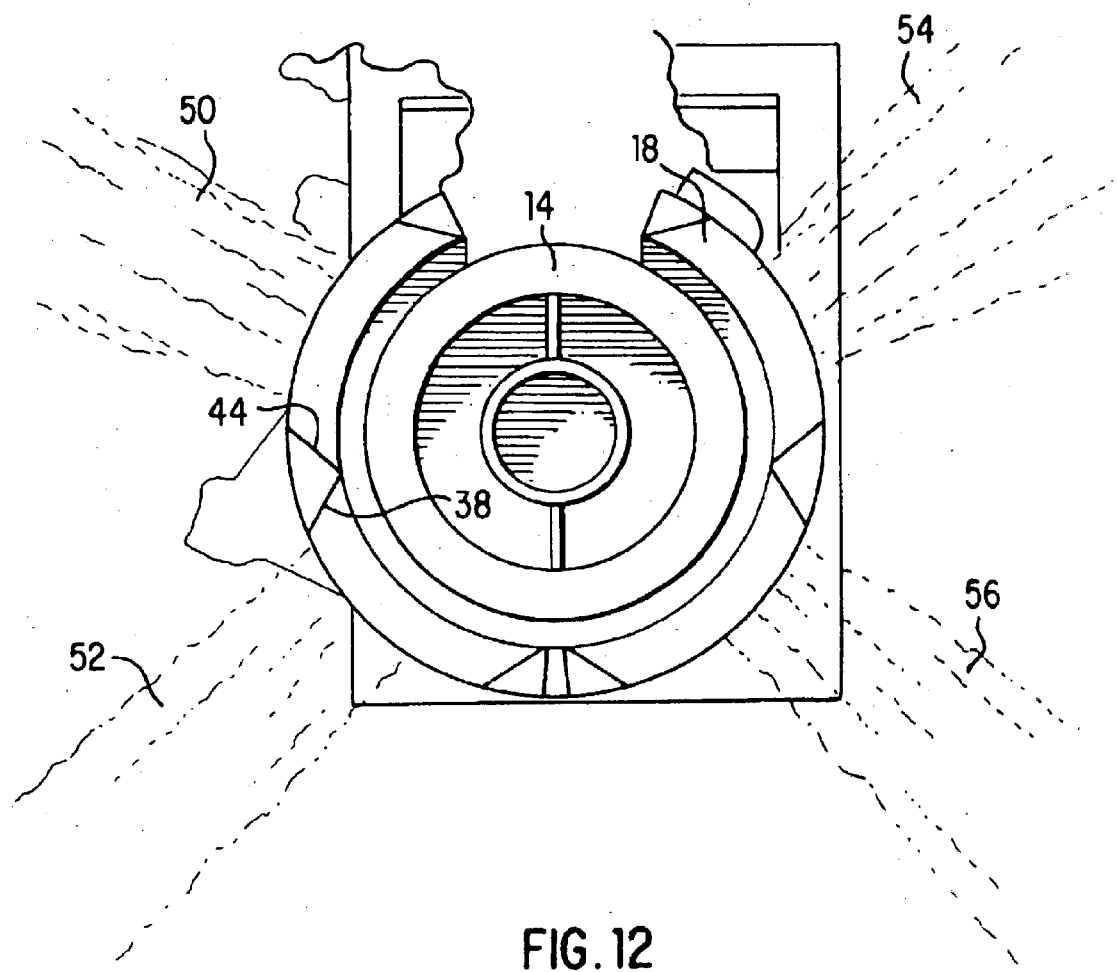
FIG. 12 is an end view from the aft direction, of a scale model test bed of the thrust reverser in an open configuration, in accordance with the invention.
Figure 23:
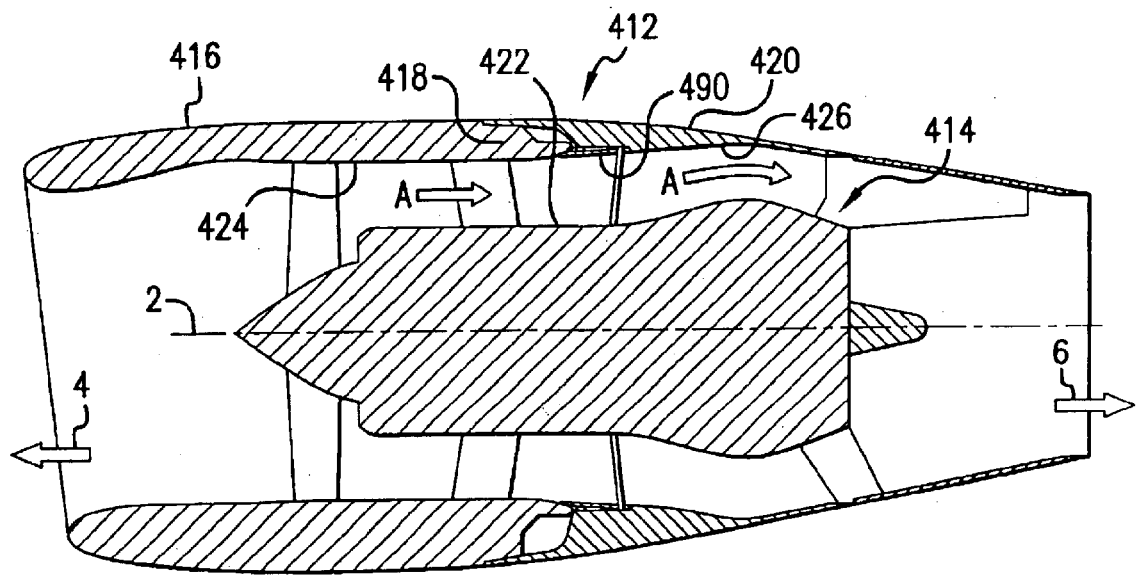
FIG. 23 is a longitudinal sectional view similar to FIG. 1, of yet another embodiment of an engine, nacelle, and thrust reverser in a closed configuration, in accordance with the invention.
Figure 24:
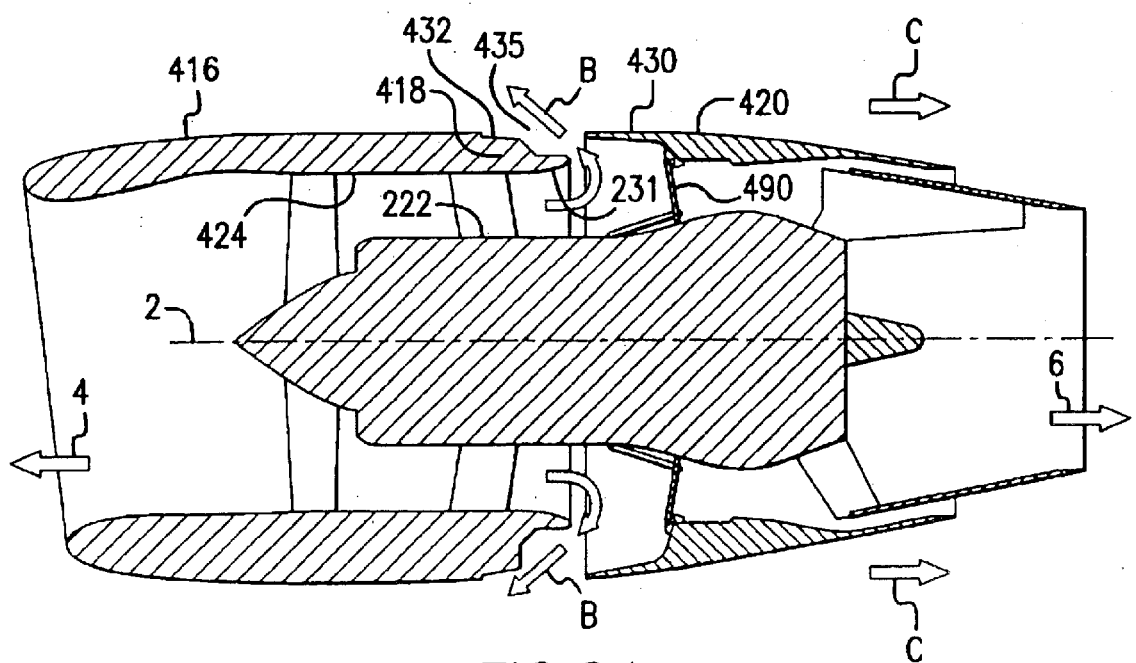
FIG. 24 is a longitudinal section view of the engine, nacelle, and thrust reverser of FIG. 23 in an open (deployed) configuration, in accordance with the invention.

Yet another embodiment of the invention is illustrated in FIGS. 23–24, and is useful in connection with blocker door type translating cowl reversers. The nacelle 410 has a thrust reverser 412, which is substantially identical to thrust reverser 12, with the differences noted herein. FIG. 23 illustrates thrust reverser 412 in the closed configuration. The air duct is defined inwardly by the core cowl 422 of the engine 414, and outwardly by the inner wall 424 of the fan cowl 416 and the inner wall 426 of the translating cowl 420. FIG. 24 illustrates the thrust reverser 412 in the deployed configuration. The translating cowl 420 moves to an aft position, as indicated by arrows C, thereby exposing the upstream wall 430 of the translating cowl 420 and the downstream wall, or ramp portion 432, of the bulkhead 418. In addition to the structures described for thrust reverser 12, above, thrust reverser 412 also includes a series of blocker doors 490, which are pivoted into the air duct to divert the flow through the outlet 435 as indicated by arrows B. If required, a series of plume control devices (not illustrated in FIG. 19) operate substantially as the plume control devices 38 described above for thrust reverser 12 to divide the flow into several plumes as illustrated in FIGS. 11–13. In addition, if required, the leading edge 444 of the translating cowl may vary as described above regarding FIGS. 14–16, and the nose portion 431 of the bulkhead may vary as described above regarding FIGS. 14 and 17, in order to control the forward component of the plume at different radial locations. If required, vane 136, as illustrated in FIG. 18 may be added to this embodiment to help control forward turning and increase the flow through the opening.

Figure 25:
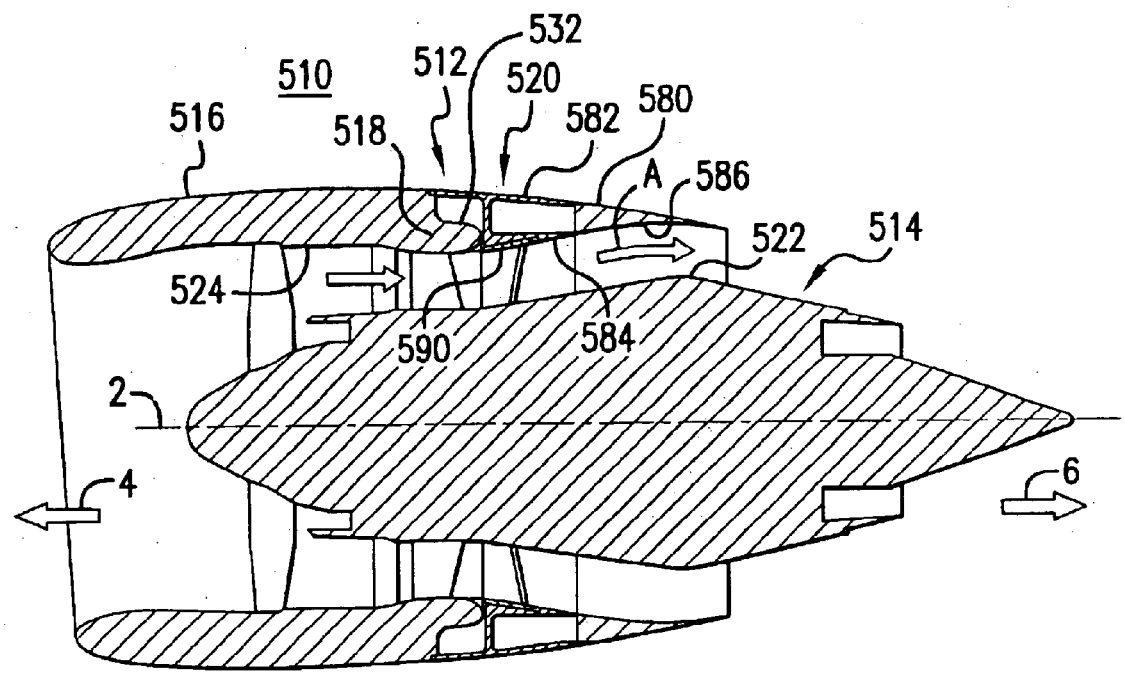
FIG. 25 is a longitudinal sectional view similar to FIG. 1, of still another embodiment of a nacelle and thrust reverser in a closed (stowed) configuration, in accordance with the invention.
Figure 26:
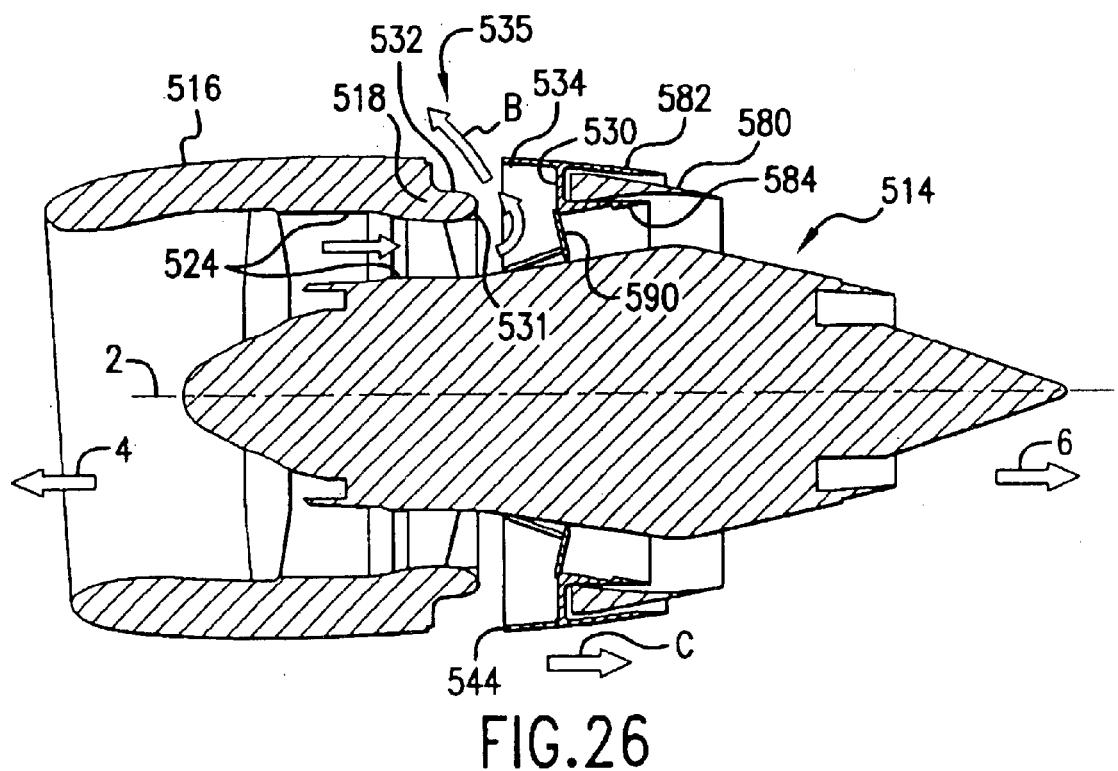
FIG. 26 is a longitudinal section view of the nacelle and thrust reverser of FIG. 25 in an open configuration, in accordance with the invention

A further embodiment of the invention is illustrated in FIGS. 25–26, and is useful in connection with a translating cowl reverser. The nacelle 510 has a thrust reverser 512, which is substantially identical to thrust reverser 12, with the differences noted herein. FIG. 25 illustrates thrust reverser 512 in the closed configuration. The air duct is defined inwardly by the core cowl 522 of the engine 514, and outwardly by the inner wall 524 of the fan cowl 516, by the inner wall 584 of the translating cowl 582, and by the inner wall 586 of a stationary aft cowl section 580. FIG. 26 illustrates the thrust reverser 512 in the deployed configuration. The translating cowl 520 moves to an aft position, as indicated by arrows C, thereby exposing the upstream wall 530 of the translating cowl 520, kicker 534, and the ramp portion 532 of the bulkhead 518. Translating cowl 520 has an inner panel 584 and an outer panel 582 which surround stationary aft cowl section 580. A series of blocker doors 590 are pivoted into the air duct to divert the flow through the outlet 535 as indicated by arrows B. If required, a series of plume control devices are not illustrated in FIG. 26, but operate substantially as plume control devices 38 described above for thrust reverser 12 to divide the flow into several plumes as illustrated in FIGS. 11–13. In addition, the leading edge 544 of the translating cowl may vary as described above regarding FIGS. 14–16, and the nose portion 531 of the bulkhead may vary as described above regarding FIGS. 14 and 17. If required, vane 136, as illustrated in FIG. 18 may be added to this embodiment to help control forward turning and increase the flow through the opening. FIGS. 20–26 shows a blocker door translating cowl reverser; however, the translating cowl configuration 520 may also be used with a blocker door-less reverser as illustrated in FIGS. 1–2.

Figure 27:
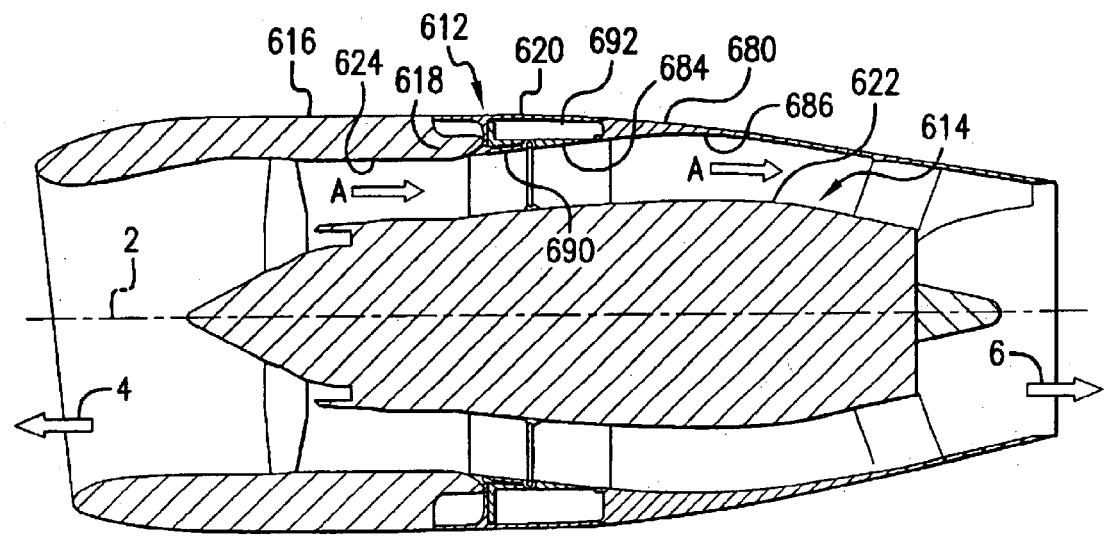
FIG. 27 is a longitudinal sectional view similar to FIG. 1, of a further embodiment of a nacelle and thrust reverser in a closed configuration, in accordance with the invention.
Figure 28:
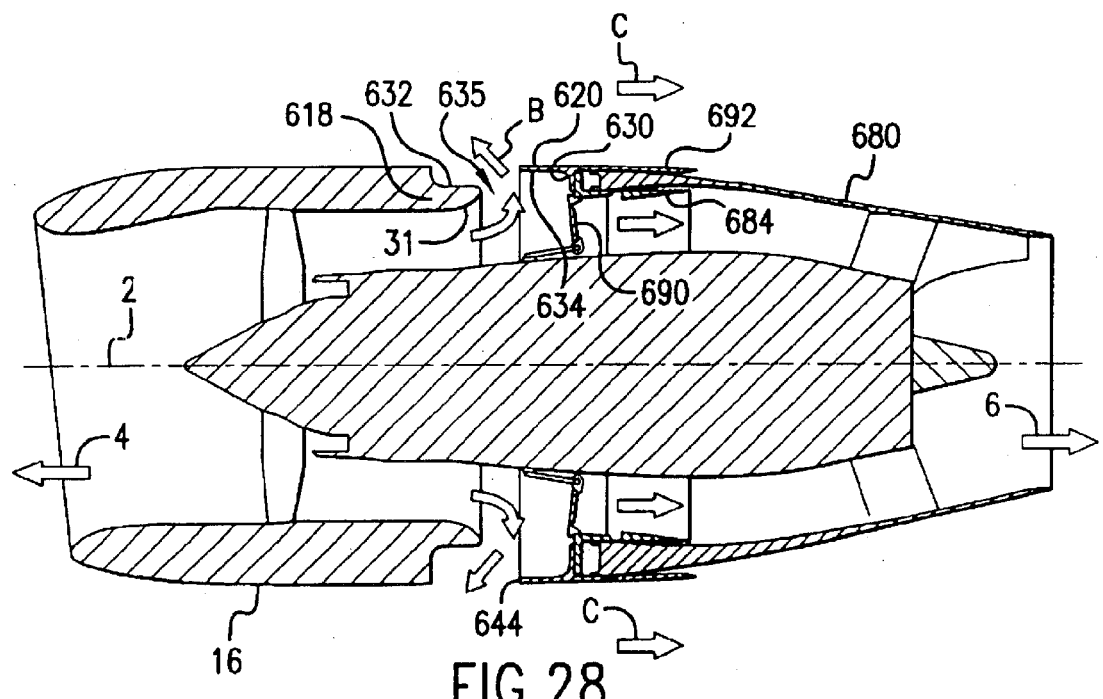
FIG. 28 is a longitudinal section view of the nacelle and thrust reverser of FIG. 27 in an open configuration, in accordance with the invention.

Yet another embodiment of the invention is illustrated in FIGS. 27–28, and is useful in connection blocker door type translating cowl reversers. The nacelle 610 has a thrust reverser 612, which is substantially identical to thrust reverser 12, with the differences noted herein. FIG. 27 illustrates thrust reverser 612 in the closed configuration. The air duct is defined inwardly by the core cowl 622 of the engine 614, and outwardly by the inner wall 624 of the fan cowl 616, by the inner wall 684 of the translating cowl 620, and by the inner wall 686 of a stationary aft cowl section 680. FIG. 28 illustrates the thrust reverser 612 in the deployed configuration. The translating cowl 620 moves to an aft position, as indicated by arrows C, thereby exposing the upstream wall 630 of the translating cowl 620, kicker 634, and the ramp portion 632 of the bulkhead 618. Translating cowl 620 has an inner wall 684 and an outer wall 692, which are individual components that move apart radially to increase the exit area and improve reverse thrust performance to surround stationary aft cowl section 680. The inner wall portion 684 and outer wall portion 692 are closely spaced with respect to one another when the translating cowl 620 is in the forward position. A series of blocker doors 690 are pivoted into the air duct to divert the flow through outlet 635 as indicated by arrows B. A series of plume control devices are not illustrated in FIG. 28, but operate substantially as plume control devices 38 described above for thrust reverser 12 to divide the flow into several plumes as illustrated in FIGS. 11–13. In addition, the leading edge 644 of the translating cowl may vary as described above regarding FIGS. 14–16, and the nose portion 631 of the bulkhead may vary as described above regarding FIGS. 14 and 17. If required, vane 136, as illustrated in FIG. 18 may be added to this embodiment to help control forward turning and increase the flow through the opening. FIG. 13 illustrated an underwing engine/nacelle installation with four circumferential openings, or plumes, per nacelle. The thrust reverser described herein may be used in with any number of circumferential openings. Other embodiments may be implemented for a fuselage mounted engine/nacelle with any number of circumferential openings.

It will be understood that the foregoing is only illustrative of the principles of the invention, and that various modifications can be made by those skilled in the art without departing from the scope and spirit of the invention.

What is claimed is:

1. A thrust reverser for a turbofan engine having an air duct defined radially inwardly by a wall around the turbofan engine and radially outwardly in part by a fan cowl of the turbofan engine, comprising:
   (a) a bulkhead adapted to be mounted on the fan cowl having a first wall defining a shaped surface, and a ramp portion located between a nose portion and the outer surface of the bulkhead;
   (b) a translating cowl having a second wall defining a shaped surface, the translating cowl supported for movement axially between a closed position substantially adjacent the bulkhead and an open position spaced axially apart from the bulkhead so as to form an outlet for discharge of air from the air duct, the air discharged from the air duct having a component of velocity in a forward direction wherein the area between the ramp portion of the bulkhead and the leading edge of the translating cowl is characterized by the absence of a cascade of flow turning vanes to turn air discharged from the air duct in a forward direction; and
   (c) a plume control device extending longitudinally across said outlet and partially circumferentially about the thrust reverser to divide the air discharged from the air duct into a plurality of plumes.

2. The thrust reverser of claim 1, wherein the plume control device defines side walls having a shaped configuration to divert the plumes to a predefined direction.

3. The thrust reverser of claim 2, wherein the plume control device is configured to divert the plumes to a predefined direction.

4. The thrust reverser of claim 3, wherein the plume control device is configured to divert the plumes at least partially in a radial direction perpendicular to the forward direction.

5. The thrust reverser of claim 3, wherein the plume control device is configured to divert the plumes at least partially in the forward direction.

6. The thrust reverser of claim 1, wherein the wall of the turbofan engine and the translating cowl cooperate to substantially block air from passing through an aft portion of the air duct when the translating cowl is in the open position.

7. The thrust reverser of claim 1, further comprising:
a plurality of blocker doors pivotably attached to one of the translating cowl and an engine core cowl to substantially block air from passing through an aft portion of the air duct when the translating cowl is in the open position.

8. The thrust reverser of claim 7, further comprising a fixed aft fan cowl section, and wherein the translating cowl has an outer wall portion and an inner wall portion configured to partially surround the fixed aft fan cowl section when the translating cowl is in the open configuration.

9. The thrust reverser of claim 8, wherein the outer wall portion and the inner wall portion are configured for relative radial movement with respect to one another, between a configuration in which the outer wall portion and the inner wall portion are closely spaced when the translating cowl is in the closed position and a spaced-apart configuration to surround the fixed aft fan cowl section when the translating cowl is in the open position.

10. A thrust reverser for a turbofan engine having an air duct defined radially inwardly by a wall around the turbofan turbine engine and radially outwardly in part by a fan cowl of the engine, comprising:
(a) a bulkhead adapted to be mounted on the fan cowl having a first wall defining a shaped surface and a ramp portion located between a nose portion and the outer surface of the bulkhead, wherein the area between the ramp portion of the bulkhead and the leading edge of the translating cowl is characterized by the absence of a cascade of flow turning vanes to turn air discharged from the air duct in a forward direction; and
(b) a translating cowl having a second wall and a kicker plate defining a shaped surface, the translating cowl supported for movement axially between a closed position substantially adjacent the bulkhead and an open position spaced axially apart from the bulkhead so as to form an outlet for discharge of air from the air duct, the air discharged from the air duct having a component of velocity in a forward direction, the kicker plate having a dimension which varies at different radial locations about a circumference of the translating cowl to selectively control a forward component of velocity of the air discharged from the air duct.

11. The thrust reverser of claim 10, further comprising a plume control device extending longitudinally across said outlet and partially circumferentially about the thrust reverser to divide the air discharged from the air duct into a plurality of plumes.

12. The thrust reverser of claim 11, wherein the plume control device defines side walls having a shaped configuration to divert the plumes to a predefined direction.

13. The thrust reverser of claim 11, wherein the plume control device is configured to divert the plumes to a predefined direction.

14. The thrust reverser of claim 13, wherein the plume control device is configured to divert the plumes at least partially in a radial direction perpendicular to the forward direction.

15. The thrust reverser of claim 13, wherein the plume control device is configured to divert the plumes at least partially in the forward direction.

16. The thrust reverser of claim 10, wherein the wall of the turbofan engine and the translating cowl cooperate to substantially block air from passing through an aft portion of the air duct when the translating cowl is in the open position.

17. The thrust reverser of claim 10, further comprising:
a plurality of blocker doors pivotably attached to one of the translating cowl and an engine core cowl to substantially block air from passing through an aft portion of the air duct when the translating cowl is in the open position.

18. The thrust reverser of claim 17, further comprising a fixed aft fan cowl section, and wherein the translating cowl has an outer wall portion and an inner wall portion configured to partially surround the fixed aft fan cowl section when the translating cowl is in the open configuration.

19. The thrust reverser of claim 18, wherein the outer wall portion and the inner wall portion are configured for relative radial movement with respect to one another, between a configuration in which the outer wall portion and the inner wall portion are closely spaced when the translating cowl is in the closed position and a spaced-apart configuration to surround the fixed aft fan cowl section when the translating cowl is in the open position.

20. A thrust reverser for a turbofan engine having an air duct defined radially inwardly by a wall around the turbofan turbine engine and radially outwardly in part by a fan cowl of the engine, comprising:
(a) a bulkhead adapted to be mounted on the fan cowl having a ramp portion located between a nose portion and the outer surface of the bulkhead, a first wall defining a shaped surface, the shaped surface having a dimension which varies at different radial locations about a circumference of the bulkhead to selectively control a forward component of velocity of the air discharged from the air duct; and
(b) a translating cowl having a second wall and a kicker plate defining a shaped surface, the translating cowl supported for movement axially between a closed position substantially adjacent the bulkhead and an open position spaced axially apart from the bulkhead so as to form an outlet for discharge of air from the air duct, the air discharged from the air duct having a forward component of velocity, wherein the area between the ramp portion of the bulkhead and the leading edge of the translating cowl is characterized by the absence of a cascade of flow turning vanes to turn air discharged from the air duct in a forward direction.

21. The thrust reverser of claim 20, further comprising a plume control device extending longitudinally across said outlet and partially circumferentially about the thrust reverser to divide the air discharged from the air duct into a plurality of plumes.

22. The thrust reverser of claim 21, wherein the plume control device defines side walls having a shaped configuration to divert the plumes to a predefined direction.

23. The thrust reverser of claim 21, wherein the plume control device is configured to divert the plumes to a predefined direction.

24. The thrust reverser of claim 23, wherein the plume control device is configured to divert the plumes at least partially in a radial direction perpendicular to the forward direction.

25. The thrust reverser of claim 23, wherein the plume control device is configured to divert the plumes at least partially in the forward direction.

26. The thrust reverser of claim 20, wherein the wall of the turbofan engine and the translating cowl cooperate to substantially block air from passing through an aft portion of the air duct when the translating cowl is in the open position.

27. The thrust reverser of claim 20, further comprising:
a plurality of blocker doors pivotably attached to one of the translating cowl and an engine core cowl to substantially block air from passing through an aft portion of the air duct when the translating cowl is in the open position.

28. The thrust reverser of claim 27, further comprising a fixed aft fan cowl section, and wherein the translating cowl has an outer wall portion and an inner wall portion configured to partially surround the fixed aft fan cowl section when the translating cowl is in the open configuration.

29. The thrust reverser of claim 28, wherein the outer wall portion and the inner wall portion are configured for relative radial movement with respect to one another, between a configuration in which the outer wall portion and the inner wall portion are closely spaced when the translating cowl is in the closed position and a spaced-apart configuration to surround the fixed aft fan cowl section when the translating cowl is in the open position.

30. A thrust reverser for a turbofan engine having an air duct defined radially inwardly by a wall around the turbofan engine and radially outwardly in part by a fan cowl of the turbofan engine, comprising:
(a) a bulkhead adapted to be mounted on the fan cowl having a first wall defining a shaped surface, and a ramp portion located between a nose portion and the outer surface of the bulkhead;
(b) a translating cowl having a second wall defining a shaped surface, the translating cowl supported for movement axially between a closed position substantially adjacent the bulkhead and an open position spaced axially apart from the bulkhead so as to form an outlet for discharge of air from the air duct, the air discharged from the air duct having a component of velocity in a forward direction, wherein the translating cowl has leading edges which cooperate with and are in proximity to corresponding edges of the bulkhead and the area between the ramp portion of the bulkhead and the leading edge of the translating cowl is characterized by the absence of a cascade of flow turning vanes to turn air discharged from the air duct in a forward direction; and
(c) a vane element spaced axially apart from the first wall of the bulkhead in an aft direction, and having an airfoil section to guide air to the outlet when the translating cowl is in the open position, the vane element supported to the bulkhead by a plurality of supports configured to divert the air to a predefined direction.

31. The thrust reverser of claim 30, wherein the vane element has a substantially ring-shaped configuration.

32. The thrust reverser of claim 30, further comprising a plume control device extending longitudinally across said outlet and partially circumferentially about the thrust reverser to divide the air discharged from the air duct into a plurality of plumes.

33. The thrust reverser of claim 32, wherein the plume control device defines side walls having a shaped configuration to divert the plumes to a predefined direction.

34. The thrust reverser of claim 32, wherein the plume control device is configured to divert the plumes to a predefined direction.

35. The thrust reverser of claim 34, wherein the plume control device is configured to divert the plumes at least partially in a radial direction perpendicular to the forward direction.

36. The thrust reverse of claim 34, wherein the plume control device is configured to divert the plumes at least partially in the forward direction.

37. The thrust reverser of claim 30, wherein the wall of the turbofan engine and the translating cowl cooperate to substantially block air from passing through an aft portion of the air duct when the translating cowl is in the open position.

38. The thrust reverser of claim 30, further comprising:
a plurality of blocker doors pivotably attached to one of the translating cowl and an engine core cowl to substantially block air from passing through an aft portion of the air duct when the translating cowl is in the open position.

39. The thrust reverser of claim 38, further comprising a fixed aft fan cowl section, and wherein the translating cowl has an outer wall portion and an inner wall portion configured to partially surround the fixed aft fan cowl section when the translating cowl is in the open configuration.

40. The thrust reverser of claim 39, wherein the outer wall portion and the inner wall portion are configured for relative radial movement with respect to one another, between a configuration in which the outer wall portion and the inner wall portion are closely spaced when the translating cowl is in the closed position and a spaced-apart configuration to surround the fixed aft fan cowl section when the translating cowl is in the open position.

41. A thrust reverser for a turbofan engine having an air duct defined radially inwardly by a wall around the turbofan engine and radially outwardly in part by a fan cowl of the turbofan engine, comprising:
(a) a bulkhead adapted to be mounted on the fan cowl having a first wall defining a shaped surface, and a ramp portion located between a nose portion and the outer surface of the bulkhead;
(b) a translating cowl having a second wall defining a shaped surface, the translating cowl supported for movement axially between a closed position substantially adjacent the bulkhead and an open position spaced axially apart from the bulkhead so as to form an outlet for discharge of air from the air duct, the air discharged from the air duct having a component of velocity in a forward direction, wherein the area between the ramp portion of the bulkhead and the leading edge of the translation cowl is characterized by the absence of a cascade of flow turning vanes to turn air discharged from the air duct in a forward direction; and
(c) a plurality of plume control devices extending longitudinally across said outlet and partially circumferentially about the thrust reverser to divide the air discharged from the air duct into a plurality of plumes, wherein the plume control devices have walls integral to the ramp portion, the walls are shaped to direct the plumes radially to a predefined direction, and a portion of air flow emerging from the thrust reverser passes around the plume control devices and is diverted into a plume exiting the thrust reverser.

* * * * *